United States Patent
Zou et al.

(10) Patent No.: US 12,242,045 B2
(45) Date of Patent: Mar. 4, 2025

(54) OPTICAL LENS, CAMERA MODULE, AND ELECTRONIC DEVICE

(71) Applicants: OFILM GROUP CO., LTD., Shenzhen (CN); JIANGXI JINGCHAO OPTICAL CO., LTD., Nanchang (CN)

(72) Inventors: Jinhua Zou, Shenzhen (CN); Ming Li, Shenzhen (CN)

(73) Assignees: OFILM GROUP CO., LTD., Shenzhen (CN); JIANGXI JINGCHAO OPTICAL CO., LTD., Nanchang (CN)

( * ) Notice: Subject to any disclaimer, the term of this patent is extended or adjusted under 35 U.S.C. 154(b) by 623 days.

(21) Appl. No.: 17/605,985

(22) PCT Filed: Oct. 23, 2020

(86) PCT No.: PCT/CN2020/123260
§ 371 (c)(1),
(2) Date: Oct. 22, 2021

(87) PCT Pub. No.: WO2022/082734
PCT Pub. Date: Apr. 28, 2022

(65) Prior Publication Data
US 2022/0308323 A1    Sep. 29, 2022

(51) Int. Cl.
*G02B 15/14* (2006.01)
*G02B 13/00* (2006.01)

(52) U.S. Cl.
CPC ...... *G02B 15/1465* (2019.08); *G02B 13/0045* (2013.01)

(58) Field of Classification Search
CPC . G02B 3/02; G02B 5/208; G02B 9/64; G02B 13/0045; G02B 13/06; G02B 13/18; G02B 15/1465; G02B 27/0025
(Continued)

(56) References Cited

U.S. PATENT DOCUMENTS 4,981,344 A    1/1991  Ueda
6,414,800 B1   7/2002  Hamano
(Continued)

FOREIGN PATENT DOCUMENTS

CN    1206842 A    2/1999
CN    1297164 A    5/2001
(Continued)

OTHER PUBLICATIONS

International Search Report on International Patent Application PCT/CN2020/087819, filed Apr. 29, 2020, in the name of Jiangxi Jingchao Optical Co. Ltd.
(Continued)

*Primary Examiner* — Stephone B Allen
*Assistant Examiner* — Daniel Jeffery Jordan
(74) *Attorney, Agent, or Firm* — Franklin & Associates International Inc; Matthew F. Lambrinos

(57) ABSTRACT

An optical lens sequentially includes, from an object side to an image side, a first lens having a negative focal power, a second lens having a negative focal power; a third lens having a positive focal power, a fourth lens having a negative focal power, a fifth lens having a negative focal power, a sixth lens having a positive focal power, and a seventh lens having a negative focal power. The optical lens satisfies the following relation: $-5<f2/f1<15$, maximum optical distortion $\leq 10\%$. Where, f1 is a focal length of the first lens, and f2 is a focal length of the second lens.

9 Claims, 11 Drawing Sheets

(58) Field of Classification Search
USPC .............. 359/357, 642, 657, 682, 751, 755
See application file for complete search history.

(56) References Cited

U.S. PATENT DOCUMENTS

| | | | |
|---|---|---|---|
| 6,985,309 | B2 | 1/2006 | Shinohara |
| 9,057,868 | B1 | 6/2015 | Chung et al. |
| 2004/0218285 | A1 | 11/2004 | Amanai |
| 2004/0264003 | A1 | 12/2004 | Noda |
| 2005/0046970 | A1 | 3/2005 | Amanai |
| 2008/0106801 | A1 | 5/2008 | Kang et al. |
| 2010/0254029 | A1 | 10/2010 | Shinohara |
| 2012/0075718 | A1 | 3/2012 | Seo |
| 2014/0063620 | A1 | 3/2014 | Jung et al. |
| 2015/0138425 | A1 | 5/2015 | Lee |
| 2016/0124192 | A1 | 5/2016 | Koreeda |
| 2016/0161709 | A1 | 6/2016 | Hsueh et al. |
| 2017/0307858 | A1 | 10/2017 | Chen |
| 2018/0113282 | A1 | 4/2018 | Tsai |
| 2020/0073092 | A1 | 3/2020 | Chen |
| 2020/0103620 | A1* | 4/2020 | Kim ................ G02B 13/06 |
| 2022/0003962 | A1* | 1/2022 | Sun ................. G02B 13/18 |

FOREIGN PATENT DOCUMENTS

| | | |
|---|---|---|
| CN | 101093274 A | 12/2007 |
| CN | 101983348 A | 3/2011 |
| CN | 102132189 A | 7/2011 |
| CN | 102419470 A | 4/2012 |
| CN | 102466864 A | 5/2012 |
| CN | 202522758 U | 11/2012 |
| CN | 102914851 A | 2/2013 |
| CN | 102985865 A | 3/2013 |
| CN | 102998774 A | 3/2013 |
| CN | 103676088 A | 3/2014 |
| CN | 103852858 A | 6/2014 |
| CN | 103969804 A | 8/2014 |
| CN | 104570277 A | 4/2015 |
| CN | 104570295 A | 4/2015 |
| CN | 104914558 A | 9/2015 |
| CN | 104932086 A | 9/2015 |
| CN | 204631345 U | 9/2015 |
| CN | 105259636 A | 1/2016 |
| CN | 105372793 A | 3/2016 |
| CN | 105607232 A | 5/2016 |
| CN | 105607233 A | 5/2016 |
| CN | 205210492 U | 5/2016 |
| CN | 205210493 U | 5/2016 |
| CN | 105988185 A | 10/2016 |
| CN | 105988186 A | 10/2016 |
| CN | 106033141 A | 10/2016 |
| CN | 106154496 A | 11/2016 |
| CN | 106338815 A | 1/2017 |
| CN | 106526796 A | 3/2017 |
| CN | 206074890 U | 4/2017 |
| CN | 106610518 A | 5/2017 |
| CN | 106646825 A | 5/2017 |
| CN | 106772931 A | 5/2017 |
| CN | 106773008 A | 5/2017 |
| CN | 106802469 A | 6/2017 |
| CN | 106842512 A | 6/2017 |
| CN | 106842514 A | 6/2017 |
| CN | 106896474 A | 6/2017 |
| CN | 106959500 A | 7/2017 |
| CN | 106970464 A | 7/2017 |
| CN | 107024756 A | 8/2017 |
| CN | 107102425 A | 8/2017 |
| CN | 107167897 A | 9/2017 |
| CN | 107167902 A | 9/2017 |
| CN | 206460205 U | 9/2017 |
| CN | 107290843 A | 10/2017 |
| CN | 206946078 U | 1/2018 |
| CN | 107703609 A | 2/2018 |
| CN | 107831588 A | 3/2018 |
| CN | 207164341 U | 3/2018 |
| CN | 107976770 A | 5/2018 |
| CN | 108089278 A | 5/2018 |
| CN | 108089317 A | 5/2018 |
| CN | 207424362 U | 5/2018 |
| CN | 207424363 U | 5/2018 |
| CN | 108107548 A | 6/2018 |
| CN | 108227146 A | 6/2018 |
| CN | 207557562 U | 6/2018 |
| CN | 108459394 A | 8/2018 |
| CN | 108761745 A | 11/2018 |
| CN | 108873250 A | 11/2018 |
| CN | 109283665 A | 1/2019 |
| CN | 109375346 A | 2/2019 |
| CN | 208506348 U | 2/2019 |
| CN | 109407267 A | 3/2019 |
| CN | 109725406 A | 5/2019 |
| CN | 109752823 A | 5/2019 |
| CN | 109814234 A | 5/2019 |
| CN | 109814235 A | 5/2019 |
| CN | 208833988 U | 5/2019 |
| CN | 208872939 U | 5/2019 |
| CN | 208888449 U | 5/2019 |
| CN | 109870786 A | 6/2019 |
| CN | 109870788 A | 6/2019 |
| CN | 109917533 A | 6/2019 |
| CN | 110018556 A | 7/2019 |
| CN | 209070186 U | 7/2019 |
| CN | 110109226 A | 8/2019 |
| CN | 110208927 A | 9/2019 |
| CN | 110261997 A | 9/2019 |
| CN | 110398815 A | 11/2019 |
| CN | 110426822 A | 11/2019 |
| CN | 110531500 A | 12/2019 |
| CN | 110568583 A | 12/2019 |
| CN | 110618522 A | 12/2019 |
| CN | 209765129 U | 12/2019 |
| CN | 110646919 A | 1/2020 |
| CN | 110646921 A | 1/2020 |
| CN | 110794555 A | 2/2020 |
| CN | 110879454 A | 3/2020 |
| CN | 111007649 A | 4/2020 |
| CN | 111025600 A | 4/2020 |
| CN | 111308688 A | 6/2020 |
| CN | 111338057 A | 6/2020 |
| CN | 210720853 U | 6/2020 |
| CN | 111399186 A | 7/2020 |
| CN | 211786331 U | 10/2020 |
| JP | 2008268977 A | 11/2008 |
| JP | 2013235242 A | 11/2013 |
| KR | 1020140135909 A | 11/2014 |
| TW | 201350956 A | 12/2013 |
| TW | I625567 B | 6/2018 |
| TW | I640811 B | 11/2018 |
| TW | I655474 B | 4/2019 |
| WO | 2003046633 A2 | 6/2003 |
| WO | 2014162779 A1 | 10/2014 |
| WO | 2015159721 A1 | 10/2015 |
| WO | 2017180362 A1 | 10/2017 |
| WO | 2020073978 A1 | 4/2020 |
| WO | 2020220444 A1 | 11/2020 |
| WO | 2020258269 A1 | 12/2020 |
| WO | 2021026869 A1 | 2/2021 |
| WO | 2021072745 A1 | 4/2021 |
| WO | 2021087661 A1 | 5/2021 |
| WO | 2021087669 A1 | 5/2021 |
| WO | 2021102943 A1 | 6/2021 |
| WO | 2021103797 A1 | 6/2021 |
| WO | 2021109127 A1 | 6/2021 |
| WO | 2021138754 A1 | 7/2021 |
| WO | 2021179207 A1 | 9/2021 |
| WO | 2021184164 A1 | 9/2021 |
| WO | 2021184165 A1 | 9/2021 |
| WO | 2021184167 A1 | 9/2021 |
| WO | 2021203277 A1 | 10/2021 |

(56) References Cited

FOREIGN PATENT DOCUMENTS

| | | |
|---|---|---|
| WO | 2021217504 A1 | 11/2021 |
| WO | 2021217664 A1 | 11/2021 |

OTHER PUBLICATIONS

U.S. Appl. No. 17/611,162, 371 filed Nov. 14, 2021, in the name of Jiangxi Jingchao Optical Co. Ltd.
International Search Report on International Patent Application PCT/CN2020/103797, filed Jul. 23, 2020, in the name of Ofilm Group Co. Ltd.
U.S. Appl. No. 17/612,556, 371 filed Nov. 18, 2021, in the name of Jiangxi Jingchao Optical Co. Ltd.
International Search Report on International Patent Application PCT/CN2020/079526, filed Mar. 16, 2020, in the name of Jiangxi Jingchao Optical Co. Ltd.
U.S. Appl. No. 17/611,165, 371 filed Nov. 14, 2021, in the name of Jiangxi Jingchao Optical Co. Ltd.
International Search Report dated Nov. 3, 2020 on International Patent Application PCT/CN2020/078814 filed Nov. 26, 2020, in the name of Jiangxi Jingchao Optical Co. Ltd.
U.S. Appl. No. 17/611,569, 371 filed Nov. 16, 2021, in the name of Jiangxi Jingchao Optical Co. Ltd.
International Search Report on International Patent Application PCT/CN2020/083697, filed Apr. 8, 2020, in the name of Jiangxi Jingchao Optical Co. Ltd.
U.S. Appl. No. 17/614,359, 371 filed Nov. 25, 2021, in the name of Jiangxi Jingchao Optical Co. Ltd.
International Search Report on International Patent Application PCT/CN2020/088515, filed Apr. 30, 2020, in the name of Jiangxi Jingchao Optical Co. Ltd.
U.S. Appl. No. 17/614,499, 371 filed Nov. 26, 2021, in the name of OFilm Group Co. Ltd. and Jiangxi Jingchao Optical Co. Ltd.
U.S. Appl. No. 17/536,006, filed Nov. 27, 2021, in the name of Jiangxi Jingchao Optical Co. Ltd.
U.S. Appl. No. 17/536,010, filed Nov. 27, 2021, in the name of Jiangxi Jingchao Optical Co. Ltd.
International Search Report on International Patent Application PCT/CN2019/122072, filed Nov. 29, 2019, in the name of Jiangxi Jingchao Optical Co. Ltd.
U.S. Appl. No. 17/606,027, 371 filed Oct. 23, 2021, in the name of Jiangxi Jingchao Optical Co. Ltd.
International Search Report on International Patent Application PCT/CN2019/111957, filed Oct. 18, 2019, in the name of Jiangxi Jingchao Optical Co. Ltd.
U.S. Appl. No. 17/606,040, 371 filed Oct. 24, 2021, in the name of Jiangxi Jingchao Optical Co. Ltd.
International Search Report dated Nov. 4, 2019 on International Patent Application PCT/CN2019/115318 filed Jul. 1, 2020, in the name of Jiangxi Jingchao Optical Co. Ltd.
U.S. Appl. No. 17/606,359, 371 filed Oct. 25, 2021, in the name of Jiangxi Jingchao Optical Co. Ltd.
International Search Report on International Patent Application PCT/CN2020/079517, filed Mar. 16, 2020, in the name of Jiangxi Jingchao Optical Co. Ltd.
U.S. Appl. No. 17/609,381, 371 filed Nov. 6, 2021, in the name of Jiangxi Jingchao Optical Co. Ltd.
International Search Report dated Jul. 16, 2020 on International Patent Application PCT/CN2019/123679 filed Aug. 25, 2020, in the name of Jiangxi Jingchao Optical Co. Ltd.
U.S. Appl. No. 17/610,693, 371 filed Nov. 11, 2021, in the name of Jiangxi Jingchao Optical Co. Ltd.
International Search Report on International Patent Application PCT/CN2020/070404, filed Jan. 6, 2020, in the name of Jiangxi Jingchao Optical Co. Ltd.
U.S. Appl. No. 17/440,691, 371 filed Sep. 17, 2021, in the name of Jiangxi Jingchao Optical Co. Ltd.
International Search Report dated Dec. 16, 2020 on International Patent Application PCT/CN2020/079515 filed Dec. 23, 2020, in the name of Jiangxi Jingchao Optical Co. Ltd.
U.S. Appl. No. 17/611,148, 371 filed Nov. 13, 2021, in the name of Jiangxi Jingchao Optical Co. Ltd.
International Search Report dated on Jan. 15, 2020 on International Patent Application PCT/CN2019/110525, filed Jan. 3, 2020, in the name of Jiangxi Jingchao Optical Co. Ltd.
U.S. Appl. No. 17/284,467, 371 filed Apr. 11, 2021, in the name of Jiangxi Jingchao Optical Co. Ltd.
International Search Report on International Patent Application PCT/CN2019/100747, filed Aug. 8, 2019, in the name of Jiangxi Jingchao Optical Co. Ltd.
U.S. Appl. No. 17/601,075, 371 filed Oct. 3, 2021, in the name of Jiangxi Jingchao Optical Co. Ltd.
International Search Report dated Mar. 27, 2019 on International Patent Application PCT/CN2020/072135, filed Jan. 15, 2020, in the name of Jiangxi Jingchao Optical Co. Ltd.
U.S. Appl. No. 17/440,786, 371 filed Sep. 19, 2021, in the name of Jiangxi Jingchao Optical Co. Ltd.
International Search Report on International Patent Application PCT/CN2019/115349, filed Dec. 4, 2019, in the name of Jiangxi Jingchao Optical Co. Ltd.
U.S. Appl. No. 17/606,005, 371 Oct. 22, 2021, in the name of Jiangxi Jingchao Optical Co. Ltd.
International Search Report on International Patent Application PCT/CN2019/093780, filed Jun. 28, 2019, in the name of Jiangxi Jingchao Optical Co. Ltd.
U.S. Appl. No. 17/605,537, 371 filed Oct. 21, 2021, in the name of Jiangxi Jingchao Optical Co. Ltd.
International Search Report dated Apr. 30, 2019 on International Patent Application PCT/CN2019/091801 filed Jun. 19, 2019, in the name of Jiangxi Jingchao Optical Co. Ltd.
U.S. Appl. No. 17/604,739, 371 filed Oct. 18, 2021, in the name of Jiangxi Jingchao Optical Co. Ltd.

* cited by examiner

OPTICAL LENS, CAMERA MODULE, AND ELECTRONIC DEVICE

CROSS-REFERENCE TO RELATED APPLICATIONS

This application is a national stage application, filed under 35 U.S.C. § 371, of International Patent Application No. PCT/CN2020/123260, filed Oct. 23, 2020, the contents of which is incorporated herein by reference in its entirety.

TECHNICAL FIELD

The present disclosure relates to optical imaging technologies, and in particular, to an optical lens, a camera module, and an electronic device.

BACKGROUND

With the rapid development of science and technology, photography and image capturing technology are also constantly developing. An optical lens in the related art includes a plurality of lenses. An arrangement of the plurality of lenses can better reduce phase difference and chromatic aberration, thereby improving imaging quality, making the molding effect better, and improving user experience. However, when taking pictures with conventional optical lenses, the distortion is relatively serious, which will affect the imaging quality, is not conducive to the usage of a user, and reduces the user experience.

SUMMARY

Accordingly, embodiments of the present disclosure provide an optical lens, a camera module, and an electronic device.

The optical lens according to an embodiment of the present disclosure, sequentially from an object side to an image side, includes a first lens having a negative focal power; a second lens having a negative focal power, an object side surface of the second lens being convex in the vicinity of an optical axis, and an image side surface of the second lens being concave in the vicinity of the optical axis; a third lens having a positive focal power, and an object side surface of the third lens being convex in the vicinity of the optical axis; a fourth lens having a negative focal power; a fifth lens having a negative focal power; a sixth lens having a positive focal power, an image side surface of the sixth lens being convex in the vicinity of the optical axis, an object side surface of the sixth lens and the image side surface of the sixth lens being aspherical, and at least one of the object side surface of the sixth lens and the image side surface of the sixth lens having at least one inflection point; and a seventh lens having a negative focal power. The optical lens satisfies the following relation: $-5<f2/f1<15$, maximum optical distortion $\leq 10\%$, wherein f1 is a focal length of the first lens, and f2 is a focal length of the second lens.

A ratio of the focal length of the second lens to the focal length of the first lens of the optical lens according to the embodiment of the present disclosure is between −5 and 15, so that the focal power of the lenses can be reasonably arranged and the shapes of the lenses can be configured reasonably, which is beneficial to enlarge the field of view of the system, improve the imaging quality, and reduce the occurrence of distortion, which is beneficial to the usage of the user.

In some embodiments, the optical lens satisfies the following relation:

$$2.5<\tan(HFOV)*TTL/ImgH<3.5;$$

wherein tan(HFOV) is a tangent value of half of a maximum field of view of the optical lens, TTL is a distance from an object side surface of the first lens to an imaging surface of the optical lens on the optical axis, and ImgH is a radius of a largest imaging circle of the optical lens.

When satisfying the above relation, the optical lens can achieve a larger field of view, and the size of the optical lens can be reduced, which is beneficial to the imaging of the optical lens, making the imaging of the optical lens more comprehensive, and is beneficial to the miniaturized manufacture of optical lens.

In some embodiments, the optical lens satisfies the following relation:

$$-15<f5/f<20;$$

wherein f is an effective focal length of the optical lens, and f5 is a focal length of the fifth lens.

When satisfying the above relation, the focal power of the fifth lens can be reasonably arranged to cooperate with correcting the aberration of the optical lens, which can reduce the occurrence of distortion, and improve the imaging quality of the optical lens.

In some embodiments, the optical lens satisfies the following relation:

$$-5<(f1+f4)/f<-3;$$

where f1 is a focal length of the first lens, f4 is a focal length of the sixth lens, and f is an effective focal length of the optical lens.

When satisfying the above relation, the focal length of the fourth lens can be reasonably arranged, thereby enlarging the field of view of the optical lens, improving the imaging quality, and effectively correcting the distortion and the aberration, which is beneficial to the usage of the user.

In some embodiments, the optical lens satisfies the following relation:

$$1.0<CT3/(T12+T23)<1.8;$$

wherein CT3 is a thickness of the third lens on the optical axis, T12 is an air gap between the first lens and the second lens on the optical axis, and T23 is an air gap between the second lens and the third lens on the optical axis.

When satisfying the above relation, there is enough space when assembling the first lens, the second lens, and the third lens, avoiding collisions between two adjacent lenses, and ensuring the normal use of the optical lens. In addition, it is beneficial to the lightness and thinning of the optical lens, and it can also avoid the difficulty in assembly due to a too small value, and can increase the sensitivity of the optical system.

In some embodiments, the optical lens satisfies the following relation:

$$-4<f12/f456<-1.5;$$

wherein f12 is a combined focal length of the first lens and the second lens, and f456 is a combined focal length of the fourth lens, the fifth lens, and the sixth lens.

When satisfying the above relation, the combined focal length of the first lens and the second lens, and the combined focal length of the fourth lens, the fifth lens, and the sixth lens can be reasonably arranged in size and direction, so as to adjust the systematic spherical aberration of the optical lens to achieve the balance of the systematic spherical aberration of the optical lens, thereby improving the molding quality of the optical lens.

In some embodiments, the optical lens satisfies the following relation:

$$-6.0<R12/R13<-2.5;$$

wherein R12 is a radius of curvature of the object side surface of the sixth lens at the optical axis, and R13 is a radius of curvature of the image side surface of the sixth lens at the optical axis.

When satisfying the above relation, the radius of curvature of the sixth lens can be adjusted to ensure the feasibility of processing the sixth lens, which is beneficial to the manufacture of the sixth lens, and can effectively correct spherical aberration and astigmatism, thereby improving the imaging quality of the optical lens.

In some embodiments, the optical lens satisfies the following relation:

$$0<(R8+R9)/(R8-R9)<2.0;$$

wherein R8 is a radius of curvature of an object side surface of the fourth lens at the optical axis, and R9 is a radius of curvature of an image side surface of the fourth lens at the optical axis.

When satisfying the above relation, the relationship between the object side surface of the fourth lens and the image side surface of the fourth lens can be adjusted, such that the optical deflection angle to be achieved by the remaining lenses can be effectively arranged, and the distortion and the aberration can be changed, thereby improving the molding quality of the optical lens 10.

The camera module according to the embodiment of the present disclosure includes the optical lens according to any one of the embodiments and a photosensitive element disposed on the image side of the optical lens.

A ratio of the focal length of the second lens to the focal length of the first lens of the camera module according to the embodiment of the present disclosure is between −5 and 15, so that the focal power of the lenses can be reasonably arranged and the shapes of the lenses can be configured reasonably, which is beneficial to enlarge the field of view of the system, improve the imaging quality, and reduce the occurrence of distortion, which is beneficial to the usage of the user.

The electronic device according to the embodiment of the present disclosure includes a housing and the camera module as described above. The camera module is mounted in the housing.

A ratio of the focal length of the second lens to the focal length of the first lens of the electronic device according to the embodiment of the present disclosure is between −5 and 15, so that the focal power of the lenses can be reasonably arranged and the shapes of the lenses can be configured reasonably, which is beneficial to enlarge the field of view of the system, improve the imaging quality, and reduce the occurrence of distortion, which is beneficial to the usage of the user.

Additional aspects and advantages of the embodiments of the present disclosure will be partly given in the following description, and part of which will become apparent from the following description, or be learned through the practice of the present disclosure.

BRIEF DESCRIPTION OF THE DRAWINGS

The above-mentioned and/or additional aspects and advantages of the present disclosure will become apparent and easy to be understood from the description of the embodiments in conjunction with the following drawings, in which.

DETAILED DESCRIPTION OF THE EMBODIMENTS

Figure 1:
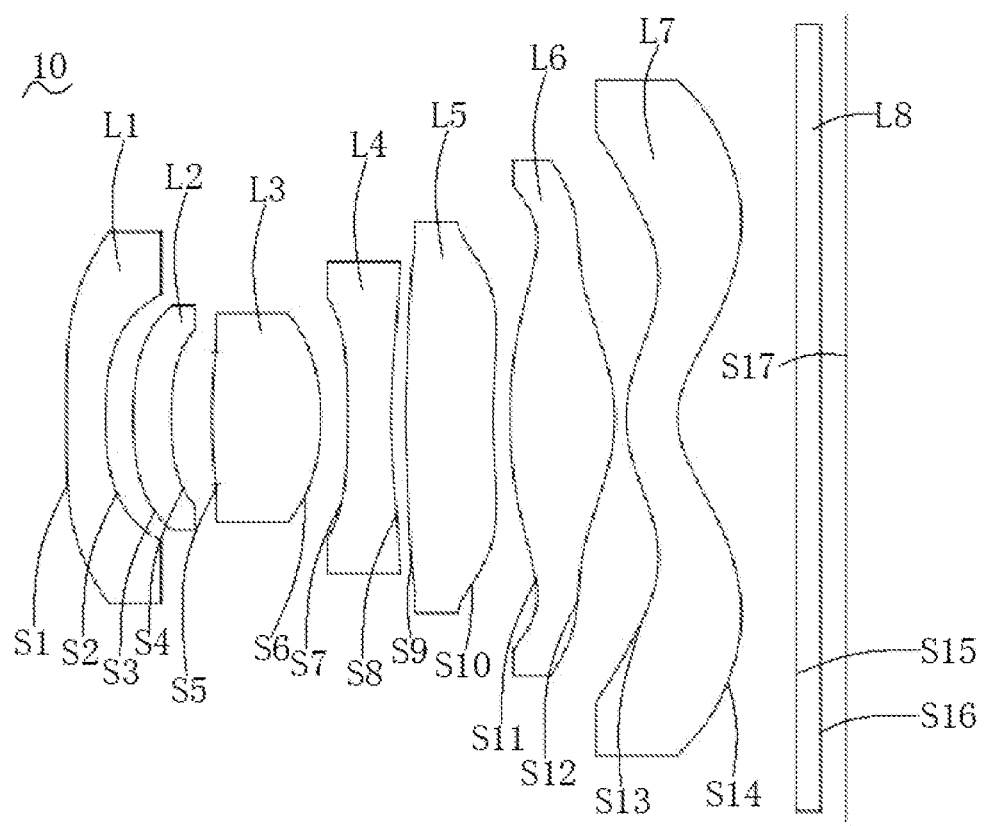
FIG. 1 is a schematic view of an optical lens according to a first embodiment of the present disclosure.

Embodiments of the present disclosure are described in detail below. Examples of the embodiments are shown in the accompanying drawings, in which the same or similar reference numerals indicate the same or similar elements or elements with the same or similar functions. The following embodiments described with reference to the accompanying drawings are exemplary, and are only used to illustrate the present disclosure, but should not be understood as limiting the present disclosure.

In the description of the present disclosure, it should be understood that orientation or positional relationships indicated by terms "center", "longitudinal", "transverse", "length", "width", "thicknes s", "upper", "lower", "front", "rear", "left", "right", "vertical", "horizontal", "top", "bottom", "inner", "outer", "clockwise", "counterclockwise", etc. are based on orientation or positional relationship shown in the drawings, which are merely to facilitate the description of the present disclosure and simplify the description, not to indicate or imply that the device or elements must have a particular orientation, be constructed and operated in a particular orientation, and therefore cannot be construed as a limitation on the present disclosure. In addition, the terms "first" and "second" are used for description only, and cannot be understood as indicating or implying relative importance or implicitly indicating the number of technical features indicated. Thus, the features defined with "first" and "second" may include one or more features explicitly or implicitly. In the description of the present disclosure, the meaning of "plurality" is two or more, unless explicitly and specifically defined otherwise.

In the description of the present disclosure, it should be noted that, unless explicitly specified and defined otherwise, terms "mounting", "connecting", and "connected" should be understood in a broad sense. For example, it may be a fixed connection or a detachable connection, or an integration; may be a mechanical connection or electrical connection, or may be in communication with each other; may be a direct connection, or may be a connection through an intermediate medium, may be the communication between two elements or the interaction relationship between two elements. The specific meanings of the above terms in the present disclosure can be understood by one of those ordinary skills in the art according to specific circumstances.

The following disclosure provides many different embodiments or examples for realizing different structures of the present disclosure. In order to simplify the disclosure of the present disclosure, components and configuration of specific examples are described below. Of course, they are only examples, and are not intended to limit the present disclosure. In addition, the present disclosure may repeat reference numerals and/or reference letters in different examples. Such repetition is for a purpose of simplification and clarity, and does not indicate the relationship between the various embodiments and/or configurations as discussed. In addition, the present disclosure provides examples of various specific processes and materials, but those of ordinary skill in the art may be aware of the application of other processes and/or the use of other materials.

Referring to FIG. 1, an optical lens 10 according to an embodiment of the present disclosure includes, from an object side to an image side, a first lens L1 having a negative focal power, a second lens L2 having a focal power, a third lens L3 having a positive focal power, a fourth lens L4 having a negative focal power, a fifth lens L5 having a focal power, a sixth lens L6 having a positive focal power, and a seventh lens L7 having a negative focal power.

The first lens L1 has an object side surface S1 and an image side surface S2. The second lens L2 has an object side surface S3 and an image side surface S4. The object side surface S3 of the second lens L2 is convex in the vicinity of an optical axis. The image side surface S4 of the second lens L2 is concave in the vicinity of the optical axis. The third lens L3 has an object side surface S5 and an image side surface S6. The object side surface S5 of the third lens L3 is convex in the vicinity of the optical axis. The fourth lens L4 has an object side surface S7 and an image side surface S8. The fifth lens L5 has an object side surface S9 and an image side surface S10. The sixth lens L6 has an object side surface S11 and an image side surface S12. The image side surface S12 of the sixth lens L6 is convex in the vicinity of the optical axis. The object side surface S11 of the sixth lens L6 and the image side surface S12 of the sixth lens L6 are both aspherical. At least one of the object side surface S11 of the sixth lens L6 and the image side surface S12 of the sixth lens L6 has at least one inflection point. That is, the object side surface S11 of the sixth lens L6 has an inflection point, and the image side surface S12 of the sixth lens L6 has no inflection point. Alternatively, the object side surface S11 of the sixth lens L6 has no inflection point, and the image side surface S12 of the sixth lens L6 has an inflection point. Alternatively, the object side surface S11 of the sixth lens L6 has an inflection point, and the image side surface S12 of the sixth lens L6 has an inflection point. Alternatively, the object side surface S11 of the sixth lens L6 has a plurality of inflection points, and the image side surface S12 of the sixth lens L6 has no inflection point. Alternatively, the object side surface S11 of the sixth lens L6 has no inflection point, and the image side surface S12 of the six lens L6 has a plurality of inflection points. Alternatively, the object side surface S11 of the sixth lens L6 has a plurality of inflection points, and the image side surface S12 of the sixth lens L6 has a plurality of inflection points. Alternatively, the object side surface S11 of the sixth lens L6 has one inflection point, the image side surface S12 of the sixth lens L6 has a plurality of inflection points. Alternatively, the object side surface S11 of the sixth lens L6 has a plurality of inflection points, and the image side surface S12 of the sixth lens L6 has one inflection point. The seventh lens L7 has an object side surface S13 and an image side surface S14.

The inflection point is also referred as an inflexion point. Mathematically, the inflection point refers to a point that changes a direction in which a curve will go upward or downward. Intuitively, the inflection point is a point at which a tangent passes through the curve (that is, a concave-convex dividing point of the curve).

In some embodiments, the optical lens 10 further includes an aperture stop STO. The aperture stop STO can be arranged on a surface of any one of the lenses, or in front of the first lens L1, or between any two lenses, or between the seventh lens L7 and a photosensitive element 20.

When the optical lens 10 is used for imaging, light emitted or reflected by an object OBJ to be captured enters the optical lens 10 from the object side, and passes through the first lens L1, the second lens L2, the third lens L3, the fourth lens L4, the fifth lens L5, the sixth lens L6, and the seventh lens L7, and is finally converged on an imaging surface S17.

Further, the optical lens 10 satisfies the following relation:

$$-5 < f2/f1 < 15, \text{ maximum optical distortion} \leq 10\%;$$

Where, f1 is a focal length of the first lens L1, and f2 is a focal length of the second lens L2.

In other words, f2/f1 can be any value in an interval (−5, 15). For example, the value is −4.5, −4, −3.5, −3, −2.5, −2, −1.5, −1, −0.5, 0, 0.5, 1, 2, 3, 4, 5, 6, 7, 8, 9, 10, 10.5, 11, 12, 13, 13.5, 14, 14.5, etc.

The maximum optical distortion is less than or equal to 10%, so that the distortion of the optical lens 10 can be reduced, the imaging quality of the optical lens 10 can be improved, and the user experience can be improved.

A ratio of the focal length of the second lens L2 to the focal length of the first lens L1 of the optical lens 10 according to the embodiment of the present disclosure is between −5 and 15, so that the focal power of the lenses can be reasonably arranged and the shapes of the lenses can be configured reasonably, which is beneficial to enlarge the field of view of the system, improve the imaging quality, and reduce the occurrence of distortion, which is beneficial to the usage of the user.

In some embodiments, the optical lens 10 satisfies the following relation:

$$2.5 < \tan(HFOV)*TTL/ImgH < 3.5;$$

Where, tan(HFOV) is a tangent value of half of the maximum field of view of the optical lens 10, TTL is a distance from the object side surface S1 of the first lens L1 to the imaging surface S17 of the optical lens 10 on the optical axis, and ImgH is a radius of the largest imaging circle of the optical lens 10.

In other words, tan(HFOV)*TTL/ImgH can be any value in an interval (2.5, 3.5). For example, the value is 2.55, 2.56, 2.6, 2.62, 2.65, 2.68, 2.7, 2.75, 2.79, 2.8, 2.83, 2.86, 2.91, 2.94, 2.95, 2.99, 3, 3.02, 3.1, 3.18, 3.28, 3.4, 3.44, 3.48, 3.49, etc.

When satisfying the above relation, the optical lens 10 can achieve a larger field of view, and the size of the optical lens 10 can be reduced, which is beneficial to the imaging of the optical lens 10, making the imaging of the optical lens 10 more comprehensive, and is beneficial to the miniaturized manufacture of optical lens 10.

In some embodiments, the optical lens 10 satisfies the following relation:

$$-15 < f5/f < 20;$$

Where, f is an effective focal length of the optical lens 10, and f5 is a focal length of the fifth lens L5.

In other words, f5/f can be any value in an interval (−15, 20). For example, the value is −14.5, −14, −13.5, −13, −12.5, −12, −11, −10, −9, −8, −7, −6, −5, −4, −3, −2, −1, 0, 1, 2, 3, 4, 5, 6, 7, 8, 9, 10, 11, 12, 13, 14, 15, 16, 17, 17.8, 18, 19, 19.5, 19.8, etc.

When satisfying the above relation, the focal power of the fifth lens L5 can be reasonably arranged to cooperate with correcting the aberration of the optical lens 10, which can reduce the occurrence of distortion, and improve the imaging quality of the optical lens 10.

In some embodiments, the optical lens 10 satisfies the following relation:

$$-5 < (f1+f4)/f < -3;$$

Where, f1 is the focal length of the first lens L1, f4 is a focal length of the sixth lens L6, and f is an effective focal length of the optical lens 10.

In other words, f1+f4 can be any value in an interval (−5, −3). For example, the value is −4.9, −4.8, −4.7, −4.5, −4.3, −4, −3.8, −3.7, −3.65, −3.62, −3.6, −3.58, −3.55, −3.52, −3.48, −3.45, −3.41, −3.38, −3.35, −3.32, −3.3, −3.28, −3.24, −3.21, −3.18, −3.16, −3.13, −3.11, −3.08, −3.05, −3.01, etc.

When satisfying the above relation, the focal length of the fourth lens L4 can be reasonably arranged, thereby enlarging the field of view of the optical lens 10, improving the imaging quality, and effectively correcting the distortion and the aberration, which is beneficial to the usage of the user.

In some embodiments, the optical lens 10 satisfies the following relation:

$$1.0 < CT3/(T12+T23) < 1.8;$$

Where, CT3 is a thickness of the third lens L3 on the optical axis, T12 is an air gap between the first lens L1 and the second lens L2 on the optical axis, and T23 is an air gap between the second lens L2 and the third lens L3 on the optical axis.

In other words, CT3/(T12+T23) can be any value in an interval (1, 1.8). For example, the value is 1.05, 1.06, 1.08, 1.09, 1.1, 1.12, 1.15, 1.17, 1.19, 1.21, 1.23, 1.25, 1.29, 1.32, 1.35, 1.38, 1.39, 1.45, 1.46, 1.49, 1.52, 1.53, 1.58, 1.62, 1.64, 1.69, 1.75, 1.78, etc.

When satisfying the above relation, there is enough space when assembling the first lens L1, the second lens L2, and the third lens L3, avoiding collisions between two adjacent lenses, and ensuring the normal use of the optical lens 10. In addition, it is beneficial to the lightness and thinning of the optical lens 10, and it can also avoid the difficulty in assembly due to a too small value, and can increase the sensitivity of the optical system.

In some embodiments, the optical lens 10 satisfies the following relation:

$$-4 < f12/f456 < -1.5;$$

Where, f12 is a combined focal length of the first lens L1 and the second lens L2, and f456 is a combined focal length of the fourth lens L4, the fifth lens L5, and the sixth lens L6.

In other words, f12/f456 can be any value in an interval (−4, −1.5). For example, the value is −3.98, −3.95, −3.92, −3.9, −3.85, −3.8, −3.76, −3.7, −3.61, −3.59, −3.52, −3.48, −3.4, −3.38, −3.3, −3.2, −3.1, −3, −2.8, −2.6, −2.3, −2.1, −1.95, −1.85, −1.78, −1.65, −1.55, −1.45, etc.

When satisfying the above relation, the combined focal length of the first lens L1 and the second lens L2, and the combined focal length of the fourth lens L4, the fifth lens L5, and the sixth lens L6 can be reasonably arranged in size and direction, so as to adjust the systematic spherical aberration of the optical lens 10 to achieve the balance of the systematic spherical aberration of the optical lens 10, thereby improving the molding quality of the optical lens 10.

In some embodiments, the optical lens 10 satisfies the following relation:

$$-6.0 < R12/R13 < -2.5;$$

Where, R12 is a radius of curvature of the object side surface of the sixth lens L6 at the optical axis, and R13 is a radius of curvature of the image side surface of the sixth lens L6 at the optical axis.

In other words, R12/R13 can be any value in an interval (−6, −2.5). For example, the value is −5.9, −5.8, −5.7, −5.6, −5.5, −5.4, −5.2, −5.1, −5, −4.9, −4.7, −4.6, −4.5, −4.2, −4.1, −3.8, −3.7, −3.5, −3.4, −3, −2.9, −2.8, −2.7, −2.6, −2.55 etc.

When satisfying the above relation, the radius of curvature of the sixth lens L6 can be adjusted to ensure the feasibility of processing the sixth lens L6, which is beneficial to the manufacture of the sixth lens L6, and can effectively correct spherical aberration and astigmatism, thereby improving the imaging quality of the optical lens 10.

In some embodiments, the optical lens 10 satisfies the following relation:

$$0 < (R8+R9)/(R8-R9) < 2.0;$$

Where, R8 is a radius of curvature of the object side surface of the fourth lens L4 at the optical axis, and R9 is a radius of curvature of the image side surface of the fourth lens L4 at the optical axis.

In other words, (R8+R9)/(R8−R9) can be any value in an interval (0, 2). For example, the value can be 0.1, 0.2, 0.3, 0.4, 0.5, 0.6, 0.7, 0.8, 0.9, 1, 1.05, 1.1, 1.15, 1.2, 1.3, 1.4, 1.5, 1.6, 1.7, 1.8, 1.82, 1.85, 1.89, 1.92, 1.95, 1.98, etc.

When satisfying the above relation, the relationship between the object side surface of the fourth lens L4 and the image side surface of the fourth lens L4 can be adjusted, such that the optical deflection angle to be achieved by the remaining lenses can be effectively arranged, and the distortion and the aberration can be changed, thereby improving the molding quality of the optical lens 10.

In some embodiments, the first lens L1, the second lens L2, the third lens L3, the fourth lens L4, the fifth lens L5, the sixth lens L6, and the seventh lens L7 are made of plastic.

Since the first lens L1 to the seventh lens L7 are plastic lenses, the optical lens 10 can effectively eliminate aberration and meet the requirement of high pixels, while achieving ultra-thinness and low cost.

In the embodiments of the present disclosure, an infrared filter L8 is made of glass. Of course, in other embodiments, the infrared filter L8 can also be made of other materials, which can be configured according to the actual situation, and is not be limited herein.

In some embodiments, at least one surface of at least one lens in the optical lens 10 is aspherical. For example, in an embodiment of the present disclosure, the object side surface S1 and the image side surface S2 of the first lens L1 are aspherical. The object side surface S3 and the image side surface S4 of the second lens L2 are aspherical. The object side surface S5 and the image side surface S6 of the third lens L3 are aspherical. The object side surface S7 and the image side surface S8 of the fourth lens L4 are aspherical. The object side surface S9 and the image side surface S10 of the fifth lens L5 are aspherical. The object side surface S11 and the image side surface S12 of the sixth lens L6 are aspherical. The object side surface S13 and the image side surface S14 of the seventh lens L7 are aspherical. An object side surface S15 and an image side surface S16 of the infrared filter are spherical.

In other words, the first lens L1, the second lens L2, the third lens L3, the fourth lens L4, the fifth lens L5, the sixth lens L6, and the seventh lens L7 are aspherical lenses. The infrared filter L8 is spherical. A surface shape of the aspherical surface is determined by the following formula.

$$Z = \frac{cr^2}{1 + \sqrt{1 - (k+1)c^2 r^2}} + Air^i$$

Where, Z is a longitudinal distance between any point on an aspherical surface and a vertex of the surface, r is a distance from any point on the aspherical surface to the optical axis, c is a curvature of the vertex (a reciprocal of the radius of curvature), k is a conic constant, and Ai is a correction coefficient of the $i^{th}$ order of the aspherical surface.

As such, the optical lens 10 can effectively reduce the total length of the optical lens 10 and can effectively correct the aberration of the optical lens 10 by adjusting the radius of curvature and aspheric coefficient of each lens surface, thereby improving the imaging quality.

First Embodiment

Referring to FIG. 1, in the first embodiment, the first lens L1 has a negative focal power. The second lens L2 has a negative focal power. The third lens L3 has a positive focal power. The fourth lens L4 has a negative focal power. The fifth lens L5 has a negative focal power. The sixth lens L6 has a positive focal power. The seventh lens L7 has a negative focal power.

The object side surface S1 is concave in the vicinity of the optical axis, and the object side surface S1 is convex in the vicinity of a circumference, and the image side surface S2 is concave. The object side surface S3 is convex, and the image side surface S4 is concave. The object side surface S5 is convex, and the image side surface S6 is convex. The object side surface S7 is concave, the image side surface S8 is concave in the vicinity of the optical axis, and the image side surface S8 is convex in the vicinity of a circumference. The object side surface S9 is convex, and the image side surface S10 is concave. The object side surface S11 is convex in the vicinity of the optical axis, the object side surface S11 is concave in the vicinity of a circumference, and the image side surface S12 is convex. The object side surface S13 is convex in the vicinity of the optical axis, the object side surface S13 is concave in the vicinity of a circumference, the image side surface S14 is concave in the vicinity of the optical axis, and the image side surface S14 is convex in the vicinity of a circumference. Further, at least one of the object side surface S11 and the image side surface S12 includes at least one inflection point. As such, an angle at which the light of the off-axis field of view is incident on the photosensitive element 20 can be effectively suppressed, thereby correcting the aberration of the off-axis field of view.

Figure 2:
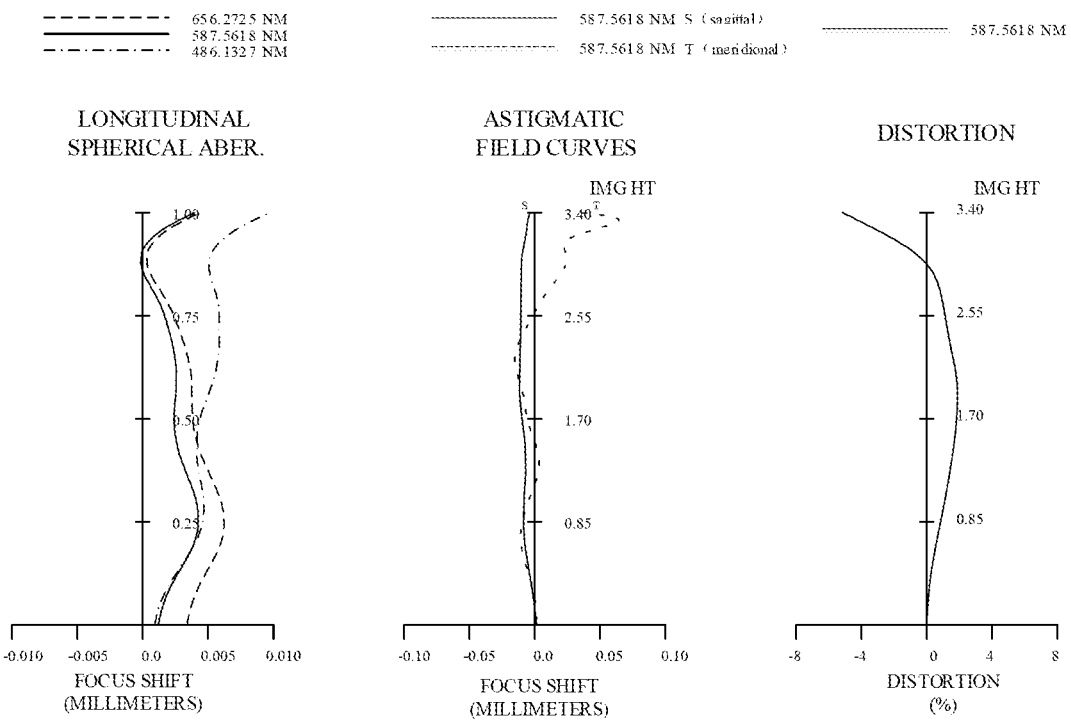
FIG. 2A is a spherical aberration graph (mm) according to the first embodiment of the present disclosure.
FIG. 2B is an astigmatism graph (mm) according to the first embodiment of the present disclosure.
FIG. 2C is a distortion graph (%) according to the first embodiment of the present disclosure.

Referring to FIGS. 2A to 2C, the optical lens 10 satisfies the conditions of the following table.

TABLE 1

First Embodiment
f = 2.39 mm, FNO = 2.40, HFOV = 56.3°, TTL = 6.831 mm

| Surface Number | Surface Name | Surface Type | Y radius | Thickness | Material | Refractive index | Abbe number | Focal Length |
|---|---|---|---|---|---|---|---|---|
| Object surface | — | Spherical | Infinite | Infinite | — | — | — | — |
| S1 | First Lens L1 | Aspherical | −57.996 | 0.342 | Plastic | 1.544 | 56.11 | −5.54 |
| S2 | | Aspherical | 3.186 | 0.245 | | | | |
| S3 | Second Lens L2 | Aspherical | 2.883 | 0.331 | Plastic | 1.661 | 20.38 | −60.77 |
| S4 | | Aspherical | 2.567 | 0.388 | | | | |
| Stop | — | Spherical | Infinite | −0.030 | — | — | — | — |
| S5 | Third Lens L3 | Aspherical | 4.723 | 0.956 | Plastic | 1.544 | 56.11 | 2.57 |
| S6 | | Aspherical | −1.841 | 0.231 | | | | |
| S7 | Fourth Lens L4 | Aspherical | −24.436 | 0.379 | Plastic | 1.661 | 20.38 | −4.69 |
| S8 | | Aspherical | 3.567 | 0.131 | | | | |
| S9 | Fifth Lens L5 | Aspherical | 5.669 | 0.763 | Plastic | 1.544 | 56.11 | −30.02 |
| S10 | | Aspherical | 4.009 | 0.154 | | | | |
| S11 | Sixth Lens L6 | Aspherical | 5.022 | 0.917 | Plastic | 1.544 | 56.11 | 2.09 |
| S12 | | Aspherical | −1.378 | 0.100 | | | | |
| S13 | Seventh Lens L7 | Aspherical | 1.084 | 0.450 | Plastic | 1.639 | 23.52 | −4.97 |
| S14 | | Aspherical | 0.677 | 1.040 | | | | |

TABLE 1-continued

First Embodiment
f = 2.39 mm, FNO = 2.40, HFOV = 56.3°, TTL = 6.831 mm

| Surface Number | Surface Name | Surface Type | Y radius | Thickness | Material | Refractive index | Abbe number | Focal Length |
|---|---|---|---|---|---|---|---|---|
| S15 | Infrared Filter | Spherical | Infinite | 0.210 | Glass | 1.517 | 64.17 | — |
| S16 | | Spherical | Infinite | 0.225 | | | | |
| Imaging Surface S17 | | Spherical | Infinite | 0.000 | — | — | — | — |

In Table 1, f is an effective focal length of the optical lens 10; FNO is an f-number of the optical lens 10; HFOV is half of the maximum field of view of the optical lens 10; TTL is the total optical length of the optical lens 10, that is, a distance from the object side surface of the first lens to the imaging surface of the optical lens on the optical axis. The unit of Y radius (radius of curvature), thickness, and focal length is mm. The reference wavelength of focal length, refractive index, and Abbe number is 587.6 nm.

TABLE 2

First Embodiment
Aspheric Coefficient

| Surface Number | S1 | S2 | S3 | S4 | S5 | S6 | S7 |
|---|---|---|---|---|---|---|---|
| K | 6.71E+01 | −3.60E+00 | −8.19E+00 | 3.35E+00 | 5.90E+00 | −3.04E−01 | 5.68E+01 |
| A4 | 1.47E−01 | 2.52E−01 | 2.39E−01 | 2.36E−01 | 2.36E−03 | −1.16E−01 | −1.81E−01 |
| A6 | −1.01E−01 | −7.43E−02 | −2.59E−01 | −3.02E−01 | 7.06E−01 | 5.38E−02 | 5.50E−02 |
| A8 | 6.80E−02 | −9.88E−02 | 1.14E+00 | 2.63E+00 | −1.03E+01 | −2.05E−01 | 2.16E−01 |
| A10 | −2.57E−02 | 7.02E−01 | −2.56E+00 | −1.09E+01 | 8.53E+01 | 7.72E−01 | −1.15E+00 |
| A12 | −3.39E−03 | −1.17E+00 | 3.10E+00 | 2.89E+01 | −4.31E+02 | −2.39E+00 | 2.67E+00 |
| A14 | 9.80E−03 | 1.03E+00 | −6.68E−01 | −4.42E+01 | 1.34E+03 | 4.60E+00 | −3.57E+00 |
| A16 | −4.97E−03 | −5.52E−01 | −2.73E+00 | 3.71E+01 | −2.51E+03 | −5.35E+00 | 2.75E+00 |
| A18 | 1.11E−03 | 3.37E−01 | 3.16E+00 | −1.49E+01 | 2.55E+03 | 3.45E+00 | −1.12E+00 |
| A20 | −9.37E−05 | −1.50E−01 | −1.18E+00 | 1.84E+00 | −1.08E+03 | −9.50E−01 | 1.85E−01 |

| Surface Number | S8 | S9 | S10 | S11 | S12 | S13 | S14 |
|---|---|---|---|---|---|---|---|
| K | −3.92E+00 | 3.74E+00 | −6.23E+00 | −9.52E+00 | −2.04E+00 | −2.53E+00 | −1.55E+00 |
| A4 | −1.62E−01 | −1.55E−01 | −6.27E−02 | 1.45E−01 | 9.92E−02 | −3.10E−02 | −2.92E−01 |
| A6 | 2.02E−01 | 1.40E−01 | −1.95E−01 | −2.34E−01 | −4.04E−02 | −1.70E−01 | 1.59E−01 |
| A8 | −1.03E−01 | 1.01E−01 | 3.95E−01 | 2.45E−01 | 2.93E−02 | 1.54E−01 | −6.15E−02 |
| A10 | −1.85E−01 | −3.90E−01 | −4.99E−01 | −1.80E−01 | −6.26E−03 | −7.08E−02 | 1.73E−02 |
| A12 | 4.19E−01 | 4.31E−01 | 4.10E−01 | 9.05E−02 | −4.93E−03 | 1.95E−02 | −3.58E−03 |
| A14 | −3.78E−01 | −2.52E−01 | −2.16E−01 | −3.06E−02 | 3.17E−03 | −3.17E−03 | 5.25E−04 |
| A16 | 1.82E−01 | 8.31E−02 | 6.94E−02 | 6.45E−03 | −7.55E−04 | 2.82E−04 | −5.05E−05 |
| A18 | −4.61E−02 | −1.45E−02 | −1.23E−02 | −7.52E−04 | 8.49E−05 | −1.07E−05 | 2.78E−06 |
| A20 | 4.79E−03 | 1.02E−03 | 9.08E−04 | 3.67E−05 | −3.75E−06 | 3.18E−08 | −6.60E−08 |

The above Table 2 lists the conic coefficient K and the even-order correction coefficient Ai of each aspherical surface (S1-S14) of the optical lens 10, which are derived from the formula of the surface shape of the aspherical surface.

FIGS. 2A to 2C are the spherical aberration graph, the astigmatism graph, and the distortion graph according to the first embodiment, respectively.

An abscissa of the spherical aberration graph represents the focus shift, and an ordinate thereof represents the normalized field of view. When the wavelengths shown in FIG. 2A are 656.2725 nm, 587.5618 nm, and 486.1327 nm, respectively, the focus shifts of different fields of view are all within 0-0.01 mm, indicating that the optical lens 10 according to this embodiment has small spherical aberration and good imaging quality.

An abscissa of the astigmatism graph represents the focus shift, and the ordinate thereof represents the image height, in unit of mm. The astigmatism graph shown in FIG. 2B indicates that the focal shifts of a sagittal image surface and a meridional image surface are all within ±0.1 mm when the wavelength is 587.5618 nm, indicating that the optical lens 10 according to this embodiment has small astigmatism and good imaging quality.

An abscissa of the distortion graph represents the distortion rate, and the ordinate thereof represents the image height, in unit of mm. The distortion graph shown in FIG. 2C indicates that the distortion at the wavelength of 587.5618 nm is within ±3.4%, indicating that the optical lens 10 according to this embodiment has been better corrected in distortion and the imaging quality is good.

Second Embodiment

Figure 3:
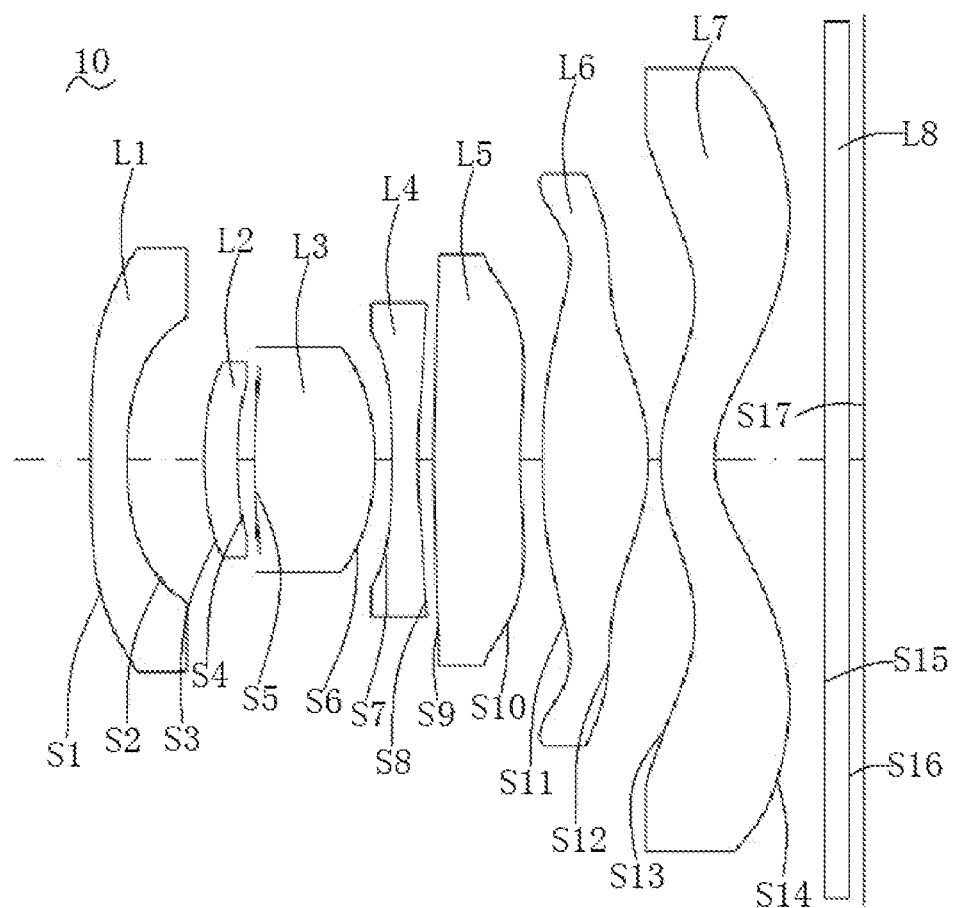
FIG. 3 is a schematic view of an optical lens according to a second embodiment of the present disclosure.

Referring to FIG. 3, in the second embodiment, the first lens L1 has a negative focal power. The second lens L2 has a positive focal power. The third lens L3 has a positive focal power. The fourth lens L4 has a negative focal power. The fifth lens L5 has a negative focal power. The sixth lens L6 has a positive focal power. The seventh lens L7 has a negative focal power.

The object side surface S1 is concave in the vicinity of the optical axis, and is convex in the vicinity of a circumference, and the image side surface S2 is concave. The object side surface S3 is convex, and the image side surface S4 is concave. The object side surface S5 is convex, and the image side surface S6 is convex. The object side surface S7 is concave, the image side surface S8 is concave in the vicinity of the optical axis, and is convex in the vicinity of a circumference. The object side surface S9 is convex, and the image side surface S10 is concave. The object side surface S11 is convex in the vicinity of the optical axis, the object side surface S11 is concave in the vicinity of a circumference, and the image side surface S12 is convex. The object side surface S13 is convex in the vicinity of the optical axis, and is concave in the vicinity of a circumference, and the image side surface S14 is concave in the vicinity of the optical axis, and is convex in the vicinity of a circumference. Further, at least one of the object side surface S11 and the image side surface S12 includes at least one inflection point. As such, an angle at which the light of the off-axis field of view is incident on the photosensitive element 20 can be effectively suppressed, thereby correcting the aberration of the off-axis field of view.

Figure 4A:
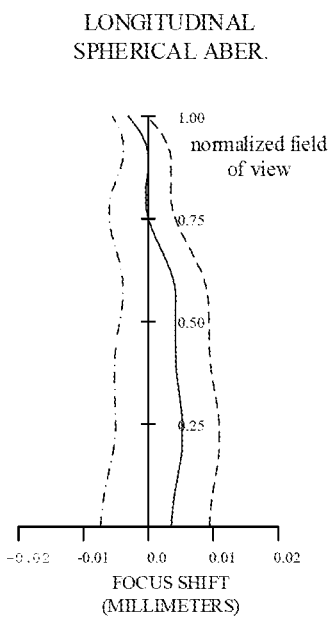
FIG. 4A is a spherical aberration graph (mm) according to the second embodiment of the present disclosure.
Figure 4B:
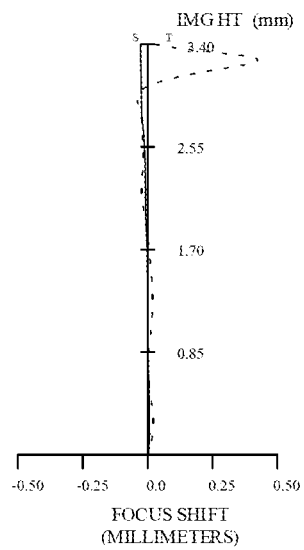
FIG. 4B is an astigmatism graph (mm) according to the second embodiment of the present disclosure.
Figure 4C:
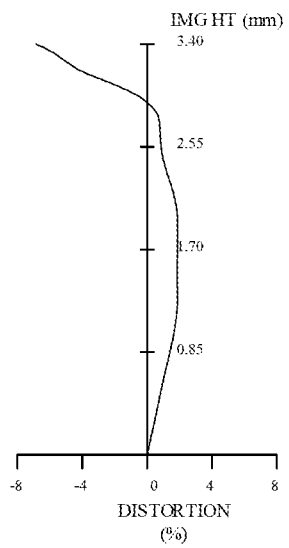
FIG. 4C is a distortion graph (%) according to the second embodiment of the present disclosure.

Referring to FIGS. 4A to 4C, the optical lens 10 satisfies the conditions in the following table.

TABLE 3

Second Embodiment
f = 2.11 mm, FNO = 2.40, HFOV = 60°, TTL = 6.569 mm

| Surface Number | Surface Name | Surface Type | Y radius | Thickness | Material | Refractive index | Abbe Number | Focal Length |
|---|---|---|---|---|---|---|---|---|
| Object surface | — | Spherical | Infinite | Infinite | — | — | — | — |
| S1 | First Lens L1 | Aspherical | −35.263 | 0.307 | Plastic | 1.544 | 56.11 | −4.66 |
| S2 | | Aspherical | 2.737 | 0.655 | | | | |
| S3 | Second Lens L2 | Aspherical | 2.438 | 0.283 | Plastic | 1.650 | 21.53 | 11.78 |
| S4 | | Aspherical | 3.412 | 0.158 | | | | |
| Stop | — | Spherical | Infinite | −0.012 | — | — | — | — |
| S5 | Third Lens L3 | Aspherical | 7.043 | 1.020 | Plastic | 1.544 | 56.11 | 2.65 |
| S6 | | Aspherical | −1.724 | 0.146 | | | | |
| S7 | Fourth Lens L4 | Aspherical | −12.492 | 0.219 | Plastic | 1.661 | 20.38 | −4.36 |
| S8 | | Aspherical | 3.768 | 0.134 | | | | |
| S9 | Fifth Lens L5 | Aspherical | 6.130 | 0.737 | Plastic | 1.544 | 56.11 | −27.30 |
| S10 | | Aspherical | 4.155 | 0.190 | | | | |
| S11 | Sixth Lens L6 | Aspherical | 6.253 | 0.900 | Plastic | 1.544 | 56.11 | 2.03 |
| S12 | | Aspherical | −1.274 | 0.100 | | | | |
| S13 | Seventh Lens L7 | Aspherical | 1.157 | 0.459 | Plastic | 1.639 | 23.52 | −4.84 |
| S14 | | Aspherical | 0.712 | 0.940 | | | | |
| S15 | Infrared Filter | Spherical | Infinite | 0.210 | Glass | 1.517 | 64.17 | — |
| S16 | | Spherical | Infinite | 0.124 | | | | |
| Imaging Surface S17 | — | Spherical | Infinite | 0.000 | — | — | — | — |

In Table 3, f is an effective focal length of the optical lens 10; FNO is an f-number of the optical lens 10; HFOV is half of the maximum field of view of the optical lens 10; TTL is the total optical length of the optical lens 10, that is, a distance from the object side surface of the first lens to the imaging surface of the optical lens on the optical axis. The unit of Y radius (radius of curvature), thickness, and focal length is mm. The reference wavelength of focal length, refractive index, and Abbe number is 587.6 nm.

TABLE 4

Second Embodiment
Aspheric Coefficient

| Surface Number | S1 | S2 | S3 | S4 | S5 | S6 | S7 |
|---|---|---|---|---|---|---|---|
| K | 9.90E+01 | −3.95E+00 | −1.12E+01 | 4.52E+00 | 2.35E+01 | −3.07E−01 | 9.90E+01 |
| A4 | 1.47E−01 | 2.25E−01 | 1.73E−01 | 1.41E−01 | −9.13E−03 | −1.48E−01 | −2.37E−01 |
| A6 | −1.01E−01 | −2.99E−01 | 9.55E−02 | 4.22E−01 | 1.66E+00 | 6.64E+00 | 5.91E−01 |
| A8 | 6.80E−02 | 1.60E+00 | −4.98E−01 | −2.89E+00 | −2.91E+01 | −4.77E+00 | −2.50E+00 |
| A10 | −2.57E−02 | −5.65E+00 | 2.30E+00 | 2.11E+01 | 2.95E+02 | 2.04E+01 | 6.42E+00 |
| A12 | −3.39E−03 | 1.26E+01 | −4.00E+00 | −8.45E+01 | −1.78E+03 | −5.34E+01 | −9.40E+00 |
| A14 | 9.80E−03 | −1.75E+01 | 1.06E+01 | 1.98E+02 | 6.51E+03 | 8.64E+01 | 7.48E+00 |
| A16 | −4.97E−03 | 1.49E+01 | 4.83E+00 | −2.66E+02 | −1.40E+04 | −8.52E+01 | −2.76E+00 |
| A18 | 1.11E−03 | −6.99E+00 | −5.47E+00 | 1.88E+02 | 1.62E+04 | 4.69E+01 | 1.29E−01 |
| A20 | −9.37E−05 | 1.39E+00 | 1.73E+00 | −5.45E+01 | −7.75E+03 | −1.10E+01 | 1.22E−01 |

| Surface Number | S8 | S9 | S10 | S11 | S12 | S13 | S14 |
|---|---|---|---|---|---|---|---|
| K | −3.18E+00 | 3.90E+00 | −6.99E+00 | −4.87E+00 | −2.12E+00 | −2.41E+00 | −1.48E+00 |
| A4 | −1.90E−01 | −1.69E−01 | −5.96E−02 | 1.54E−01 | 1.09E−01 | −3.05E−02 | −2.62E−01 |

TABLE 4-continued

Second Embodiment
Aspheric Coefficient

| | | | | | | | |
|---|---|---|---|---|---|---|---|
| A6  | 4.17E−01  | 9.15E−02  | −2.22E−01 | −2.48E−01 | −1.11E−01 | −1.44E−01 | 1.40E−01  |
| A8  | −8.77E−01 | 3.96E−01  | 3.94E−01  | 2.56E−01  | 1.58E−01  | 1.31E−01  | −5.78E−02 |
| A10 | 1.36E+00  | −1.05E+00 | −4.40E−01 | −1.79E−01 | −1.13E−01 | −6.19E−02 | 1.85E−02  |
| A12 | −1.39E+00 | 1.25E+00  | 3.37E−01  | 8.45E−02  | 4.54E−02  | 1.80E−02  | −4.36E−03 |
| A14 | 9.07E−01  | −8.56E−01 | −1.73E−01 | −2.70E−02 | −1.11E−02 | −3.22E−03 | 6.97E−04  |
| A16 | −3.59E−01 | 3.46E−01  | 5.56E−02  | 5.45E−03  | 1.69E−03  | 3.44E−04  | −6.94E−05 |
| A18 | 7.85E−02  | −7.69E−02 | −9.95E−03 | −6.17E−04 | −1.48E−04 | −1.99E−05 | 3.85E−06  |
| A20 | −7.29E−03 | 7.22E−03  | 7.39E−04  | 2.94E−05  | 5.64E−06  | 4.70E−07  | −9.01E−08 |

The above Table 4 lists the conic coefficient K and the even-order correction coefficient Ai of each aspherical surface (S1-S14) of the optical lens 10, which are derived from the formula of the surface shape of the aspherical surface.

FIGS. 4A to 4B are the spherical aberration graph, the astigmatism graph, and the distortion graph according to the second embodiment, respectively.

An abscissa of the spherical aberration graph represents the focus shift, and an ordinate thereof represents the normalized field of view. When the wavelengths shown in FIG. 4A are 656.2725 nm, 587.5618 nm, and 486.1327 nm, respectively, the focus shifts of different fields of view are all within ±0.01 mm, indicating that the optical lens 10 according to this embodiment has small spherical aberration and good imaging quality.

An abscissa of the astigmatism graph represents the focus shift, and the ordinate thereof represents the image height, in unit of mm. The astigmatism graph shown in FIG. 4B indicates that the focal shifts of a sagittal image surface and a meridional image surface are all within ±0.5 mm when the wavelength is 587.5618 nm, indicating that the optical lens 10 according to this embodiment has small astigmatism and good imaging quality.

An abscissa of the distortion graph represents the distortion rate, and the ordinate thereof represents the image height, in unit of mm. The distortion graph shown in FIG. 4C indicates that the distortion at the wavelength of 587.5618 nm is within ±3.4%, indicating that the optical lens 10 according to this embodiment has been better corrected in distortion and the imaging quality is good.

Third Embodiment

Figure 5:
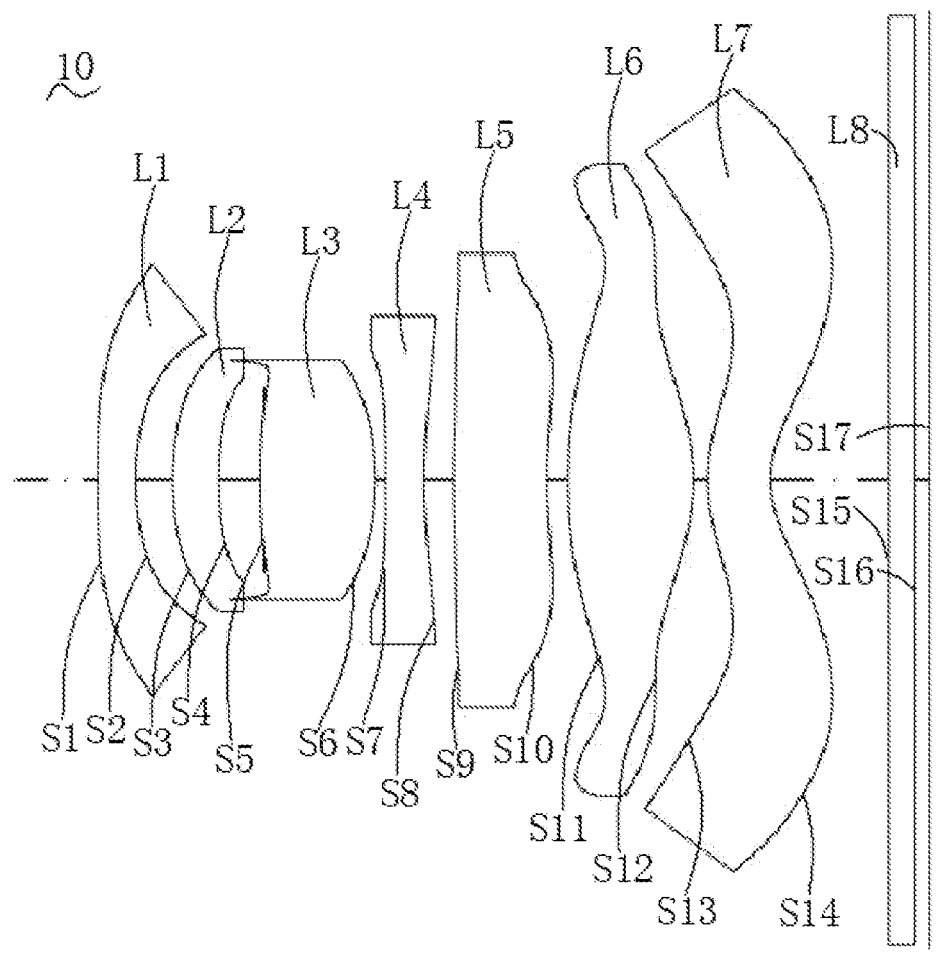
FIG. 5 is a schematic view of an optical lens according to a third embodiment of the present disclosure.

Referring to FIG. 5, in the third embodiment, the first lens L1 has a negative focal power. The second lens L2 has a positive focal power. The third lens L3 has a positive focal power. The fourth lens L4 has a negative focal power. The fifth lens L5 has a negative focal power. The sixth lens L6 has a positive focal power. The seventh lens L7 has a negative focal power.

The object side surface S1 is convex, and the image side surface S2 is concave. The object side surface S3 is convex, and the image side surface S4 is concave. The object side surface S5 is convex, and the image side surface S6 is convex. The object side surface S7 is convex in the vicinity of the optical axis, and is concave in the vicinity of a circumference, the image side surface S8 is concave. The object side surface S9 is convex, and the image side surface S10 is concave in the vicinity of the optical axis, and is convex in the vicinity of a circumference. The object side surface S11 is convex in the vicinity of the optical axis, and is concave in the vicinity of a circumference, and the image side surface S12 is convex. The object side surface S13 is convex in the vicinity of the optical axis, and is concave in the vicinity of a circumference, the image side surface S14 is concave in the vicinity of the optical axis, and is convex in the vicinity of a circumference. Further, at least one of the object side surface S11 and the image side surface S12 includes at least one inflection point. As such, an angle at which the light of the off-axis field of view is incident on the photosensitive element 20 can be effectively suppressed, thereby correcting the aberration of the off-axis field of view.

Figures 6A, 6B, 6C:
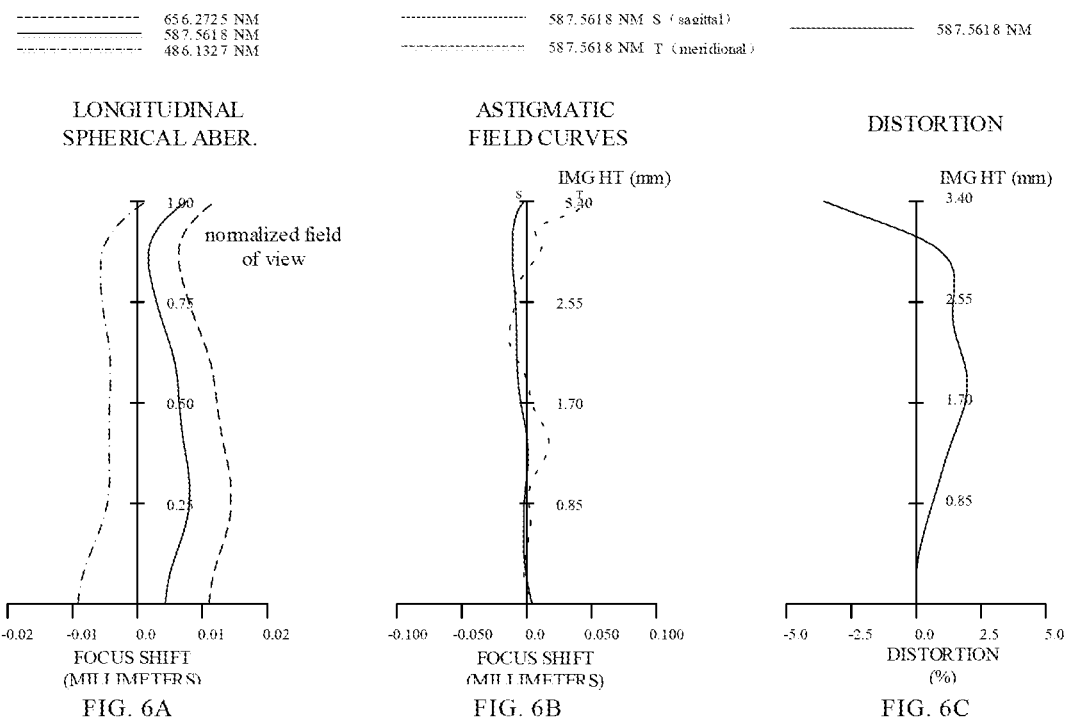
FIG. 6A is a spherical aberration graph (mm) according to the third embodiment of the present disclosure.
FIG. 6B is an astigmatism graph (mm) according to the third embodiment of the present disclosure.
FIG. 6C is a distortion graph (%) according to the third embodiment of the present disclosure.

Referring to FIGS. 6A to 6C, the optical lens 10 satisfies the conditions of the following table.

TABLE 5

Third Embodiment
f = 2.37 mm, FNO = 2.35, HFOV = 56°, TTL = 6.616 mm

| Surface Number | Surface Name | Surface Type | Y radius | Thickness | Material | Refractive index | Abbe Number | Focal Length |
|---|---|---|---|---|---|---|---|---|
| Object surface | — | Spherical | Infinite | Infinite | — | — | — | — |
| S1 | First Lens L1 | Aspherical | 29.561 | 0.300 | Plastic | 1.544 | 56.11 | −4.36 |
| S2 |  | Aspherical | 2.193 | 0.292 |  |  |  |  |
| S3 | Second Lens L2 | Aspherical | 2.036 | 0.364 | Plastic | 1.650 | 21.53 | 14.29 |
| S4 |  | Aspherical | 2.405 | 0.365 |  |  |  |  |
| Stop | — | Spherical | Infinite | −0.032 | — | — | — | — |
| S5 | Third Lens L3 | Aspherical | 4.743 | 0.920 | Plastic | 1.544 | 56.11 | 2.58 |
| S6 |  | Aspherical | −1.867 | 0.080 |  |  |  |  |
| S7 | Fourth Lens L4 | Aspherical | 160.979 | 0.305 | Plastic | 1.661 | 20.38 | −5.27 |
| S8 |  | Aspherical | 3.382 | 0.233 |  |  |  |  |
| S9 | Fifth Lens L5 | Aspherical | 5.869 | 0.746 | Plastic | 1.544 | 56.11 | −19.25 |
| S10 |  | Aspherical | 3.597 | 0.166 |  |  |  |  |
| S11 | Sixth Lens L6 | Aspherical | 4.352 | 1.000 | Plastic | 1.544 | 56.11 | 2.03 |
| S12 |  | Aspherical | −1.365 | 0.115 |  |  |  |  |
| S13 | Seventh Lens L7 | Aspherical | 1.240 | 0.499 | Plastic | 1.639 | 23.52 | −3.80 |
| S14 |  | Aspherical | 0.693 | 0.934 |  |  |  |  |

TABLE 5-continued

Third Embodiment
f = 2.37 mm, FNO = 2.35, HFOV = 56°, TTL = 6.616 mm

| Surface Number | Surface Name | Surface Type | Y radius | Thickness | Material | Refractive index | Abbe Number | Focal Length |
|---|---|---|---|---|---|---|---|---|
| S15 | Infrared Filter | Spherical | Infinite | 0.210 | Glass | 1.517 | 64.17 | — |
| S16 | | Spherical | Infinite | 0.119 | | | | |
| Imaging Surface S17 | — | Spherical | Infinite | 0.000 | — | — | — | — |

In Table 5, f is an effective focal length of the optical lens 10; FNO is an f-number of the optical lens 10; HFOV is half of the maximum field of view of the optical lens 10; TTL is the total optical length of the optical lens 10, that is, a distance from the object side surface of the first lens to the imaging surface of the optical lens on the optical axis. The unit of Y radius (radius of curvature), thickness, and focal length is mm. The reference wavelength of focal length, refractive index, and Abbe number is 587.6 nm.

TABLE 6

Third Embodiment
Aspheric Coefficient

| Surface Number | S1 | S2 | S3 | S4 | S5 | S6 | S7 |
|---|---|---|---|---|---|---|---|
| K | 9.90E+01 | −2.82E+00 | −8.82E+00 | 2.09E+00 | 1.15E+01 | −3.50E−01 | −9.90E+01 |
| A4 | 1.47E−01 | 2.37E−01 | 2.22E−01 | 1.55E−01 | −2.15E−03 | −1.67E−01 | −2.53E−01 |
| A6 | −1.01E−01 | −5.30E−02 | −7.49E−02 | 1.06E−01 | 8.77E−01 | 5.02E−01 | 6.84E−01 |
| A8 | 6.80E−02 | 2.94E−02 | 1.30E−01 | −4.94E−01 | −1.24E+01 | −2.33E+00 | −2.30E+00 |
| A10 | −2.57E−02 | −2.58E−02 | 3.86E−02 | 5.34E+00 | 1.00E+02 | 6.93E+00 | 4.81E+00 |
| A12 | −3.39E−03 | 5.02E−01 | −2.15E+00 | −2.39E+01 | −4.93E+02 | −1.38E+01 | −6.31E+00 |
| A14 | 9.80E−03 | −1.18E+00 | 4.99E+00 | 6.08E+01 | 1.49E+03 | 1.85E+01 | 4.93E+00 |
| A16 | −4.97E−03 | 1.21E+00 | −6.30E+00 | −8.50E+01 | −2.70E+03 | −1.59E+01 | −2.00E+00 |
| A18 | 1.11E−03 | −5.20E−01 | 4.34E+00 | 6.11E+01 | 2.64E+03 | 8.17E+00 | 2.52E−01 |
| A20 | −9.37E−05 | 5.25E−02 | −1.31E+00 | −1.76E+01 | −1.07E+03 | −1.91E+00 | 3.86E−02 |

| Surface Number | S8 | S9 | S10 | S11 | S12 | S13 | S14 |
|---|---|---|---|---|---|---|---|
| K | −3.23E+00 | 1.83E+00 | −4.86E+00 | −4.86E+00 | −2.17E+00 | −2.96E+00 | −1.55E+00 |
| A4 | −1.93E−01 | −1.78E−01 | −6.80E−02 | 1.54E−01 | 1.31E−01 | −3.28E−02 | −3.51E−01 |
| A6 | 5.04E−01 | 2.04E−01 | −1.75E−01 | −2.58E−01 | −1.37E−01 | −2.52E−01 | 2.21E−01 |
| A8 | −1.09E+00 | −7.34E−02 | 3.43E−01 | 2.78E−01 | 1.52E−01 | 2.78E−01 | −9.58E−02 |
| A10 | 1.57E+00 | −1.33E−01 | −4.25E−01 | −2.04E−01 | −9.25E−02 | −1.60E−01 | 2.90E−02 |
| A12 | −1.49E+00 | 2.18E−01 | 3.45E−01 | 1.01E−01 | 3.26E−02 | 5.65E−02 | −6.19E−03 |
| A14 | 9.16E−01 | −1.46E−01 | −1.82E−01 | −3.30E−02 | −7.16E−03 | −1.24E−02 | 9.02E−04 |
| A16 | −3.48E−01 | 5.05E−02 | 5.98E−02 | 6.72E−03 | 9.81E−04 | 1.64E−03 | −8.39E−05 |
| A18 | 7.40E−02 | −8.46E−03 | −1.09E−02 | −7.57E−04 | −8.03E−05 | −1.21E−04 | 4.41E−06 |
| A20 | −6.74E−03 | 4.67E−04 | 8.40E−04 | 3.58E−05 | 2.91E−06 | 3.79E−06 | −9.84E−08 |

The above Table 6 lists the conic coefficient K and the even-order correction coefficient Ai of each aspherical surface (S1-S14) of the optical lens 10, which are derived from the formula of the surface shape of the aspherical surface.

FIGS. 6A to 6C are the spherical aberration graph, the astigmatism graph, and the distortion graph according to the third embodiment, respectively.

An abscissa of the spherical aberration graph represents the focus shift, and an ordinate thereof represents the normalized field of view. When the wavelengths shown in FIG. 6A are 656.2725 nm, 587.5618 nm, and 486.1327 nm, respectively, the focus shifts of different fields of view are all within ±0.02 mm, indicating that the optical lens 10 according to this embodiment has small spherical aberration and good imaging quality.

An abscissa of the astigmatism graph represents the focus shift, and the ordinate thereof represents the image height, in unit of mm. The astigmatism graph shown in FIG. 6B indicates that the focal shifts of a sagittal image surface and a meridional image surface are all within ±0.05 mm when the wavelength is 587.5618 nm, indicating that the optical lens 10 according to this embodiment has small astigmatism and good imaging quality.

An abscissa of the distortion graph represents the distortion rate, and the ordinate thereof represents the image height, in unit of mm. The distortion graph shown in FIG. 6C indicates that the distortion at the wavelength of 587.5618 nm is within ±3.4%, indicating that the optical lens 10 according to this embodiment has been better corrected in distortion and the imaging quality is good.

Fourth Embodiment

Figure 7:
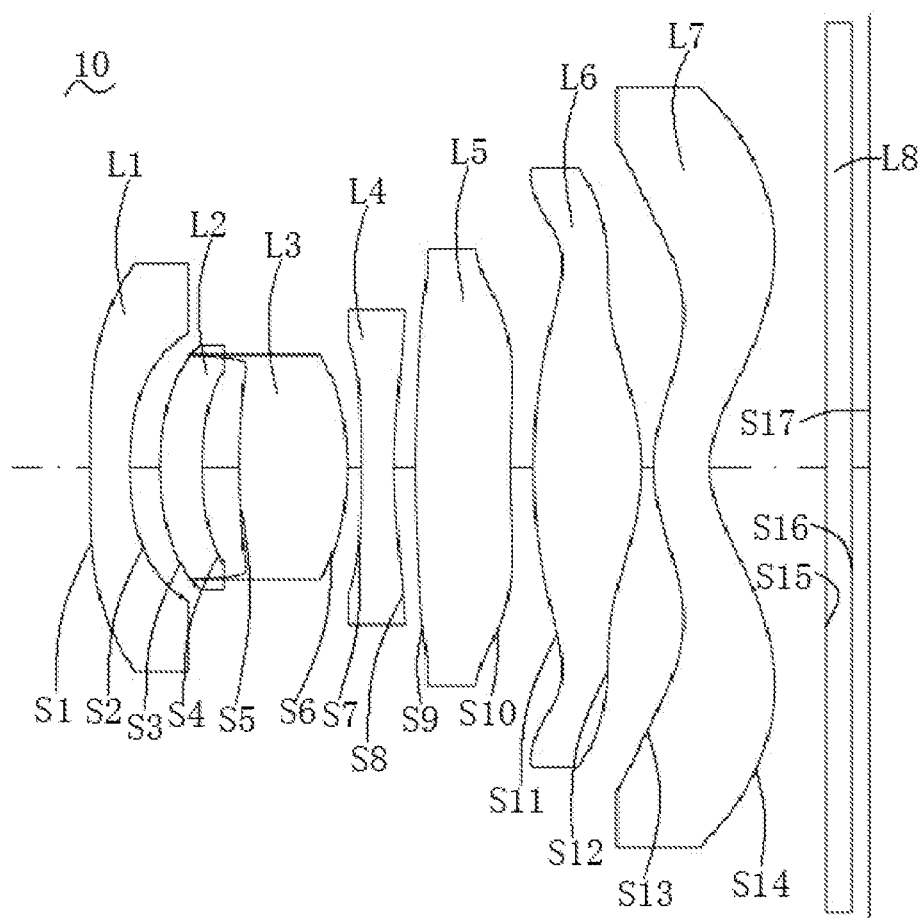
FIG. 7 is a schematic view of an optical lens according to a fourth embodiment of the present disclosure.

Referring to FIG. 7, in the fourth embodiment, the first lens L1 has a negative focal power. The second lens L2 has a positive focal power. The third lens L3 has a positive focal power. The fourth lens L4 has a negative focal power. The fifth lens L5 has a positive focal power. The sixth lens L6 has a positive focal power. The seventh lens L7 has a negative focal power.

The object side surface S1 is convex, and the image side surface S2 is concave. The object side surface S3 is convex, and the image side surface S4 is concave. The object side surface S5 is convex, and the image side surface S6 is convex. The object side surface S7 is convex in the vicinity of the optical axis, and is concave in the vicinity of a circumference, the image side surface S8 is concave. The object side surface S9 is convex, and the image side surface S10 is concave in the vicinity of the optical axis, and is convex in the vicinity of a circumference. The object side surface S11 is convex in the vicinity of the optical axis, and is concave in the vicinity of a circumference, and the image side surface S12 is convex. The object side surface S13 is convex in the vicinity of the optical axis, and is concave in the vicinity of a circumference, the image side surface S14 is concave in the vicinity of the optical axis, and is convex in the vicinity of a circumference. Further, at least one of the object side surface S11 and the image side surface S12 includes at least one inflection point. As such, an angle at which the light of the off-axis field of view is incident on the photosensitive element 20 can be effectively suppressed, thereby correcting the aberration of the off-axis field of view.

Figure 8:
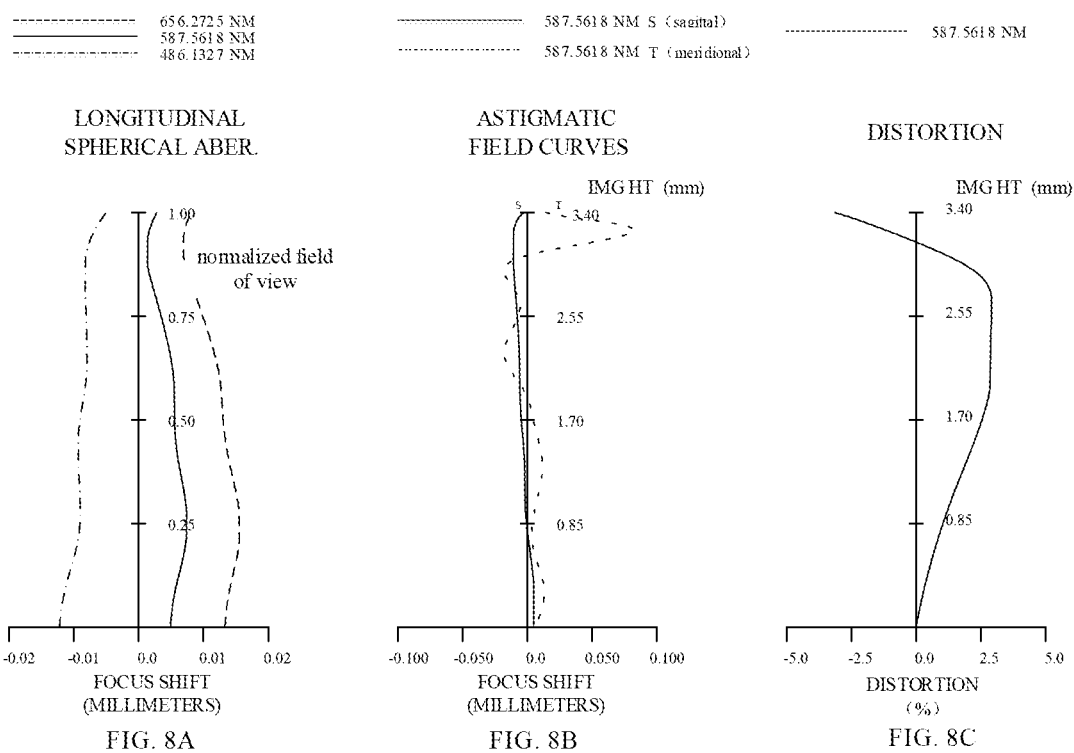
FIG. 8A is a spherical aberration graph (mm) according to the fourth embodiment of the present disclosure.
FIG. 8B is an astigmatism graph (mm) according to the fourth embodiment of the present disclosure.
FIG. 8C is a distortion graph (%) according to the fourth embodiment of the present disclosure.

Referring to FIGS. 8A to 8C, the optical lens 10 satisfies the conditions of the following table.

TABLE 7

Fourth Embodiment
f = 2.30 mm, FNO = 2.4, HFOV = 57°, TTL = 6.5 mm

| Surface Number | Surface Name | Surface Type | Y radius | Thickness | Material | Refractive index | Abbe Number | Focal Length |
|---|---|---|---|---|---|---|---|---|
| Object surface | — | Spherical | Infinite | Infinite | — | — | — | — |
| S1 | First Lens L1 | Aspherical | 270.967 | 0.330 | Plastic | 1.544 | 56.11 | −3.80 |
| S2 | | Aspherical | 2.050 | 0.255 | | | | |
| S3 | Second Lens L2 | Aspherical | 1.903 | 0.354 | Plastic | 1.661 | 20.38 | 10.56 |
| S4 | | Aspherical | 2.424 | 0.331 | | | | |
| Stop | — | Spherical | Infinite | −0.028 | — | — | — | — |
| S5 | Third Lens L3 | Aspherical | 4.894 | 0.904 | Plastic | 1.544 | 56.11 | 2.85 |
| S6 | | Aspherical | −2.120 | 0.112 | | | | |
| S7 | Fourth Lens L4 | Aspherical | 34.555 | 0.278 | Plastic | 1.661 | 20.38 | −5.52 |
| S8 | | Aspherical | 3.287 | 0.172 | | | | |
| S9 | Fifth Lens L5 | Aspherical | 4.950 | 0.792 | Plastic | 1.537 | 54.02 | 41.69 |
| S10 | | Aspherical | 6.000 | 0.200 | | | | |
| S11 | Sixth Lens L6 | Aspherical | 5.583 | 0.902 | Plastic | 1.535 | 55.80 | 2.23 |
| S12 | | Aspherical | −1.431 | 0.100 | | | | |
| S13 | Seventh Lens L7 | Aspherical | 1.168 | 0.467 | Plastic | 1.639 | 23.52 | −4.70 |
| S14 | | Aspherical | 0.710 | 0.968 | | | | |
| S15 | Infrared Filter | Spherical | Infinite | 0.210 | Glass | 1.517 | 64.17 | — |
| S16 | | Spherical | Infinite | 0.153 | | | | |
| Imaging Surface S17 | — | Spherical | Infinite | 0.000 | — | — | — | — |

In Table 7, f is an effective focal length of the optical lens 10; FNO is an f-number of the optical lens 10; HFOV is half of the maximum field of view of the optical lens 10; TTL is the total optical length of the optical lens 10, that is, a distance from the object side surface of the first lens to the imaging surface of the optical lens on the optical axis. The unit of Y radius (radius of curvature), thickness, and focal length is mm. The reference wavelength of focal length, refractive index, and Abbe number is 587.6 nm.

TABLE 8

Fourth Embodiment
Aspheric Coefficient

| Surface Number | S1 | S2 | S3 | S4 | S5 | S6 | S7 |
|---|---|---|---|---|---|---|---|
| K | 9.90E+01 | −3.70E+00 | −8.58E+00 | 2.05E+00 | 1.49E+01 | −3.55E−01 | −9.90E+01 |
| A4 | 1.47E−01 | 2.44E−01 | 2.26E−01 | 1.40E−01 | 4.51E−03 | −1.23E−01 | −2.13E−01 |
| A6 | −1.01E−01 | −1.33E−01 | −2.13E−01 | 1.41E−01 | 1.01E+00 | 9.88E−02 | 3.40E−01 |
| A8 | 6.80E−02 | 6.25E−01 | 1.04E+00 | −1.82E−01 | −1.55E+01 | −4.18E−01 | −7.82E−01 |
| A10 | −2.57E−02 | −2.56E+00 | −3.13E+00 | 2.20E+00 | 1.37E+02 | 1.31E+00 | 9.26E−01 |
| A12 | −3.39E−03 | 7.30E+00 | 6.49E+00 | −1.10E+01 | −7.40E+02 | −3.61E+00 | −1.36E+00 |
| A14 | 9.80E−03 | −1.27E+01 | −8.76E+00 | 3.21E+01 | 2.45E+03 | 7.26E+00 | −1.24E+00 |
| A16 | −4.97E−03 | 1.30E+01 | 7.54E+00 | −5.02E+01 | −4.79E+03 | −9.33E+00 | 1.75E+00 |
| A18 | 1.11E−03 | −7.22E+00 | −3.73E+00 | 3.92E+01 | 5.08E+03 | 6.71E+00 | −1.02E+00 |
| A20 | −9.37E−05 | 1.65E+00 | 7.70E−01 | −1.20E+01 | −2.23E+03 | −2.03E+00 | 2.27E−01 |

| Surface Number | S8 | S9 | S10 | S11 | S12 | S13 | S14 |
|---|---|---|---|---|---|---|---|
| K | −3.54E+00 | 3.40E+00 | 8.89E−01 | −7.57E+00 | −2.16E+00 | −2.74E+00 | −1.53E+00 |
| A4 | −2.10E−01 | −1.71E−01 | −6.10E−02 | 1.38E−01 | 1.18E−01 | −3.87E−02 | −3.01E−01 |

TABLE 8-continued

Fourth Embodiment
Aspheric Coefficient

| | | | | | | | |
|---|---|---|---|---|---|---|---|
| A6 | 4.73E−01 | 2.11E−01 | −1.67E−01 | −2.17E−01 | −8.85E−02 | −1.66E−01 | 1.75E−01 |
| A8 | −8.62E−01 | −1.18E−01 | 3.21E−01 | 2.29E−01 | 8.69E−02 | 1.63E−01 | −7.33E−02 |
| A10 | 1.08E+00 | −4.89E−02 | −4.07E−01 | −1.67E−01 | −4.56E−02 | −8.21E−02 | 2.24E−02 |
| A12 | −8.91E−01 | 1.39E−01 | 3.46E−01 | 8.32E−02 | 1.17E−02 | 2.52E−02 | −4.95E−03 |
| A14 | 4.74E−01 | −1.06E−01 | −1.90E−01 | −2.75E−02 | −1.28E−03 | −4.75E−03 | 7.61E−04 |
| A16 | −1.53E−01 | 4.13E−02 | 6.49E−02 | 5.64E−03 | −1.55E−05 | 5.31E−04 | −7.55E−05 |
| A18 | 2.66E−02 | −8.17E−03 | −1.23E−02 | −6.38E−04 | 1.51E−05 | −3.18E−05 | 4.28E−06 |
| A20 | −1.89E−03 | 6.36E−04 | 9.84E−04 | 3.01E−05 | −8.99E−07 | 7.69E−07 | −1.04E−07 |

The above Table 8 lists the conic coefficient K and the even-order correction coefficient Ai of each aspherical surface (S1-S14) of the optical lens 10, which are derived from the formula of the surface shape of the aspherical surface.

FIGS. 8A to 8C are the spherical aberration graph, the astigmatism graph, and the distortion graph according to the fourth embodiment, respectively.

An abscissa of the spherical aberration graph represents the focus shift, and an ordinate thereof represents the normalized field of view. When the wavelengths shown in FIG. 8A are 656.2725 nm, 587.5618 nm, and 486.1327 nm, respectively, the focus shifts of different fields of view are all within ±0.02 mm, indicating that the optical lens 10 according to this embodiment has small spherical aberration and good imaging quality.

An abscissa of the astigmatism graph represents the focus shift, and the ordinate thereof represents the image height, in unit of mm. The astigmatism graph shown in FIG. 8B indicates that the focal shifts of a sagittal image surface and a meridional image surface are all within ±0.1 mm when the wavelength is 587.5618 nm, indicating that the optical lens 10 according to this embodiment has small astigmatism and good imaging quality.

An abscissa of the distortion graph represents the distortion rate, and the ordinate thereof represents the image height, in unit of mm. The distortion graph shown in FIG. 8C indicates that the distortion at the wavelength of 587.5618 nm is within ±3.4%, indicating that the optical lens 10 according to this embodiment has been better corrected in distortion and the imaging quality is good.

Fifth Embodiment

Figure 9:
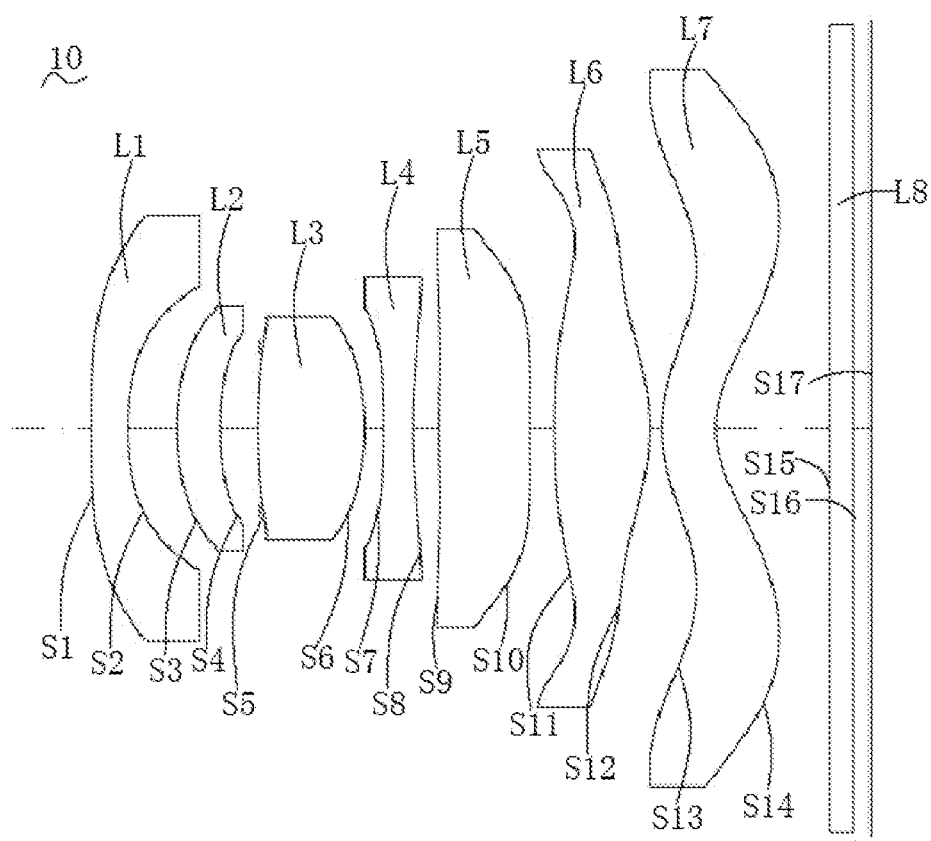
FIG. 9 is a schematic view of an optical lens according to a fifth embodiment of the present disclosure.

Referring to FIG. 9, in the fifth embodiment, the first lens L1 has a negative focal power. The second lens L2 has a positive focal power. The third lens L3 has a positive focal power. The fourth lens L4 has a negative focal power. The fifth lens L5 has a positive focal power. The sixth lens L6 has a positive focal power. The seventh lens L7 has a negative focal power.

The object side surface S1 is convex, and the image side surface S2 is concave. The object side surface S3 is convex, and the image side surface S4 is concave. The object side surface S5 is convex, and the image side surface S6 is convex. The object side surface S7 is concave, and the image side surface S8 is concave. The object side surface S9 is convex, and the image side surface S10 is concave in the vicinity of the optical axis, and is convex in the vicinity of a circumference. The object side surface S11 is convex in the vicinity of the optical axis, and is concave in the vicinity of a circumference, and the image side surface S12 is convex. The object side surface S13 is convex in the vicinity of the optical axis, and is concave in the vicinity of a circumference, the image side surface S14 is concave in the vicinity of the optical axis, and is convex in the vicinity of a circumference. Further, at least one of the object side surface S11 and the image side surface S12 includes at least one inflection point. As such, an angle at which the light of the off-axis field of view is incident on the photosensitive element 20 can be effectively suppressed, thereby correcting the aberration of the off-axis field of view.

Figure 10A:
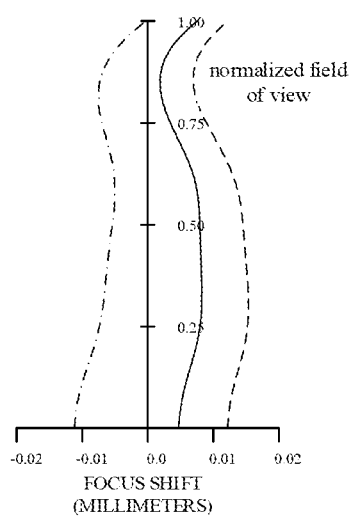
FIG. 10A is a spherical aberration graph (mm) according to the fifth embodiment of the present disclosure.
Figure 10B:
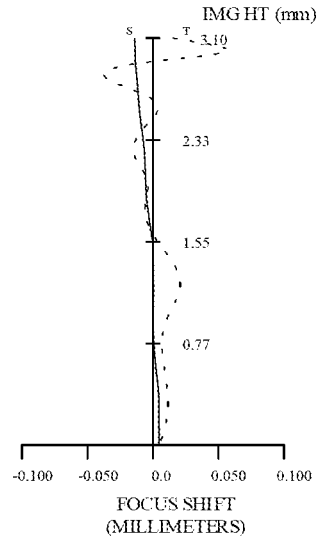
FIG. 10B is an astigmatism graph (mm) according to the fifth embodiment of the present disclosure.
Figure 10C:
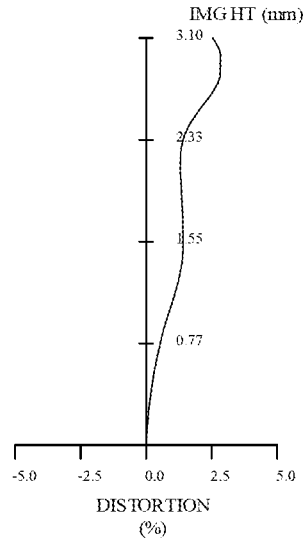
FIG. 10C is a distortion graph (%) according to the fifth embodiment of the present disclosure.

Referring to FIGS. 10A to 10C, the optical lens 10 satisfies the conditions of the following table.

TABLE 9

Fifth Embodiment
f = 2.15 mm, FNO = 2.2, HFOV = 55°, TTL = 6.555 mm

| Surface Number | Surface Name | Surface Type | Y radius | Thickness | Material | Refractive index | Abbe Number | Focal Length |
|---|---|---|---|---|---|---|---|---|
| Object surface | — | Spherical | Infinite | Infinite | — | — | — | — |
| S1 | First Lens L1 | Aspherical | 72.316 | 0.300 | Plastic | 1.544 | 56.11 | −3.64 |
| S2 | | Aspherical | 1.924 | 0.421 | | | | |
| S3 | Second Lens L2 | Aspherical | 1.927 | 0.366 | Plastic | 1.660 | 20.42 | 9.19 |
| S4 | | Aspherical | 2.611 | 0.327 | | | | |
| Stop | — | Spherical | Infinite | −0.015 | — | — | — | — |
| S5 | Third Lens L3 | Aspherical | 5.085 | 0.900 | Plastic | 1.544 | 56.11 | 2.48 |
| S6 | | Aspherical | −1.723 | 0.155 | | | | |
| S7 | Fourth Lens L4 | Aspherical | −10.493 | 0.251 | Plastic | 1.656 | 20.70 | −4.16 |
| S8 | | Aspherical | 3.723 | 0.214 | | | | |
| S9 | Fifth Lens L5 | Aspherical | 8.122 | 0.770 | Plastic | 1.537 | 54.02 | 28.65 |
| S10 | | Aspherical | 16.391 | 0.207 | | | | |
| S11 | Sixth Lens L6 | Aspherical | 8.532 | 0.799 | Plastic | 1.535 | 55.80 | 2.46 |
| S12 | | Aspherical | −1.532 | 0.100 | | | | |
| S13 | Seventh Lens L7 | Aspherical | 1.074 | 0.454 | Plastic | 1.639 | 23.52 | −6.15 |
| S14 | | Aspherical | 0.704 | 0.956 | | | | |

TABLE 9-continued

Fifth Embodiment
f = 2.15 mm, FNO = 2.2, HFOV = 55°, TTL = 6.555 mm

| Surface Number | Surface Name | Surface Type | Y radius | Thickness | Material | Refractive index | Abbe Number | Focal Length |
|---|---|---|---|---|---|---|---|---|
| S15 | Infrared Filter | Spherical | Infinite | 0.210 | Glass | 1.517 | 64.17 | — |
| S16 | | Spherical | Infinite | 0.140 | | | | |
| Imaging Surface S17 | — | Spherical | Infinite | 0.000 | — | — | — | — |

In Table 9, f is an effective focal length of the optical lens 10; FNO is an f-number of the optical lens 10; HFOV is half of the maximum field of view of the optical lens 10; TTL is the total optical length of the optical lens 10, that is, a distance from the object side surface of the first lens to the imaging surface of the optical lens on the optical axis. The unit of Y radius (radius of curvature), thickness, and focal length is mm. The reference wavelength of focal length, refractive index, and Abbe number is 587.6 nm.

TABLE 10

Fifth Embodiment
Aspheric Coefficient

| Surface Number | S1 | S2 | S3 | S4 | S5 | S6 | S7 |
|---|---|---|---|---|---|---|---|
| K | −9.90E+01 | −2.71E+00 | −8.71E+00 | 3.89E+00 | 1.71E+01 | −3.62E−01 | 9.90E+01 |
| A4 | 1.47E−01 | 2.44E−01 | 2.33E−01 | 1.39E−01 | 1.00E−02 | −7.27E−02 | −1.88E−01 |
| A6 | −1.01E−01 | −2.34E−01 | −3.00E−01 | 1.92E−01 | 6.26E−01 | −1.29E−01 | 2.80E−01 |
| A8 | 6.80E−02 | 1.30E+00 | 2.12E+00 | −2.56E−01 | −8.66E+00 | 6.10E−01 | −8.07E−01 |
| A10 | −2.57E−02 | −4.98E+00 | −8.81E+00 | 1.69E+00 | 6.72E+01 | −2.28E+00 | 1.42E+00 |
| A12 | −3.39E−03 | 1.25E+01 | 2.37E+01 | −5.36E+00 | −3.13E+02 | 4.46E+00 | −1.94E+00 |
| A14 | 9.80E−03 | −1.96E+01 | −4.03E+01 | 1.37E+01 | 8.83E+02 | −4.16E+00 | 2.16E+00 |
| A16 | −4.97E−03 | 1.85E+01 | 4.25E+01 | −2.04E+01 | −1.47E+03 | 6.53E−01 | −1.66E+00 |
| A18 | 1.11E−03 | −9.55E+00 | −2.54E+01 | 1.48E+01 | 1.32E+03 | 1.62E+00 | 7.19E−01 |
| A20 | −9.37E−05 | 2.06E+00 | 6.57E+00 | −4.03E+00 | −4.94E+02 | −8.42E−01 | −1.29E−01 |

| Surface Number | S8 | S9 | S10 | S11 | S12 | S13 | S14 |
|---|---|---|---|---|---|---|---|
| K | −2.77E+00 | −7.86E−01 | −1.15E+01 | −9.18E+00 | −1.74E+00 | −2.54E+00 | −1.59E+00 |
| A4 | −2.03E−01 | −1.72E−01 | −1.36E−01 | 9.14E−02 | 8.01E−02 | −5.28E−02 | −2.52E−01 |
| A6 | 4.41E−01 | 1.93E−01 | 7.17E−02 | −2.12E−02 | 8.39E−02 | −7.25E−02 | 1.25E−01 |
| A8 | −7.76E−01 | −9.15E−02 | −1.61E−01 | −7.50E−02 | −1.15E−01 | 2.92E−02 | −4.87E−02 |
| A10 | 9.04E−01 | −4.47E−02 | 1.79E−01 | 9.51E−02 | 7.43E−02 | 9.00E−03 | 1.45E−02 |
| A12 | −6.73E−01 | 7.63E−02 | −1.11E−01 | −5.91E−02 | −3.15E−02 | −9.55E−03 | −3.16E−03 |
| A14 | 3.16E−01 | −2.29E−02 | 4.10E−02 | 2.10E−02 | 8.60E−03 | 3.05E−03 | 4.65E−04 |
| A16 | −8.89E−02 | −1.00E−02 | −9.02E−03 | −4.31E−03 | −1.40E−03 | −4.91E−04 | −4.26E−05 |
| A18 | 1.32E−02 | 7.54E−03 | 1.34E−03 | 4.82E−04 | 1.23E−04 | 4.06E−05 | 2.16E−06 |
| A20 | −7.50E−04 | −1.31E−03 | −1.27E−04 | −2.29E−05 | −4.40E−06 | −1.37E−06 | −4.57E−08 |

The above Table 10 lists the conic coefficient K and the even-order correction coefficient $A_i$ of each aspherical surface (S1-S14) of the optical lens 10, which are derived from the formula of the surface shape of the aspherical surface.

FIGS. 10A to 10C are the spherical aberration graph, the astigmatism graph, and the distortion graph according to the fifth embodiment, respectively.

An abscissa of the spherical aberration graph represents the focus shift, and an ordinate thereof represents the normalized field of view. When the wavelengths shown in FIG. 10A are 656.2725 nm, 587.5618 nm, and 486.1327 nm, respectively, the focus shifts of different fields of view are all within ±0.02 mm, indicating that the optical lens 10 according to this embodiment has small spherical aberration and good imaging quality.

An abscissa of the astigmatism graph represents the focus shift, and the ordinate thereof represents the image height, in unit of mm. The astigmatism graph shown in FIG. 10B indicates that the focal shifts of a sagittal image surface and a meridional image surface are all within ±0.1 mm when the wavelength is 587.5618 nm, indicating that the optical lens 10 according to this embodiment has small astigmatism and good imaging quality.

An abscissa of the distortion graph represents the distortion rate, and the ordinate thereof represents the image height, in unit of mm. The distortion graph shown in FIG. 10C indicates that the distortion at the wavelength of 587.5618 nm is within ±3.1%, indicating that the optical lens 10 according to this embodiment has been better corrected in distortion and the imaging quality is good.

For the above relation −5<f2/f1<15, the values of f2 and f1 in the first embodiment to the fifth embodiment are shown in Table 11 below.

TABLE 11

| | f2/f1 | value of f2/f1 |
|---|---|---|
| First Embodiment | −60.77/(−5.54) | 10.969 |
| Second Embodiment | 11.78/(−4.66) | −2.528 |
| Third Embodiment | 14.29/(−4.36) | −3.278 |

TABLE 11-continued

| — | f2/f1 | value of f2/f1 |
|---|---|---|
| Fourth Embodiment | 10.56/(−3.8) | −2.779 |
| Fifth Embodiment | 9.19/(−3.64) | −2.525 |

For the above relation 2.5<tan(HFOV)*TTL/ImgH<3.5, the values of HFOV, TTL, and ImgH in the first embodiment to the fifth embodiment are shown in Table 12 below.

TABLE 12

| — | tan(HFOV)*TTL/ImgH | value of tan(HFOV)*TTL/ImgH |
|---|---|---|
| First Embodiment | tan(56.3)*6.831/3.4 | 3.013 |
| Second Embodiment | tan(60)*6.569/3.4 | 3.346 |
| Third Embodiment | tan(56)*6.616/3.4 | 2.885 |
| Fourth Embodiment | tan(57)*6.5/3.4 | 2.944 |
| Fifth Embodiment | tan(55)*6.555/3.1 | 3.02 |

For the above relation −15<f5/f<20, the values of f5 and f in the first embodiment to the fifth embodiment are shown in Table 13 below.

TABLE 13

| — | f5/f | value of f5/f |
|---|---|---|
| First Embodiment | −30.02/2.39 | −12.561 |
| Second Embodiment | −27.3/2.11 | −12.938 |
| Third Embodiment | −19.25/2.37 | −8.122 |
| Fourth Embodiment | 41.69/2.3 | 18.126 |
| Fifth Embodiment | 28.65/2.15 | 13.325 |

For the above relation −3<(f1+f4)/f<−5, the values of f1, f4, and f in the first to fifth embodiments are shown in Table 14 below.

TABLE 14

| — | (f1 + f4)/f | value of f5/f |
|---|---|---|
| First Embodiment | (−5.54 − 4.69)/2.39 | −4.280 |
| Second Embodiment | (−4.66 − 4.36)/2.11 | −4.275 |
| Third Embodiment | (−4.36 − 5.27)/2.37 | −4.063 |
| Fourth Embodiment | (−3.8 − 5.52)/2.3 | −4.052 |
| Fifth Embodiment | (−3.64 − 4.16)/2.15 | −3.630 |

For the above relation 1.0<CT3/(T12+T23)<1.8, the values of CT3, T12, and T23 in the first embodiment to the fifth embodiment are shown in Table 15 below.

TABLE 15

| — | CT3/(T12 + T23) | value of CT3/(T12 + T23) |
|---|---|---|
| First Embodiment | 0.956/(0.245 + 0.358) | 1.58 |
| Second Embodiment | 1.02/(0.655 + 0.146) | 1.27 |
| Third Embodiment | 0.92/(0.292 + 0.332) | 1.47 |
| Fourth Embodiment | 0.904/(0.255 + 0.303) | 1.62 |
| Fifth Embodiment | 0.9/(0.421 + 0.312) | 1.23 |

For the above relation −4<f12/f456<−1.5, the values of f12 and f456 in the first embodiment to the fifth embodiment are shown in Table 16.

TABLE 16

| — | f12/f456 | value of f12/f456 |
|---|---|---|
| First Embodiment | −4.83/2.34 | −2.064 |
| Second Embodiment | −8.02/2.21 | −3.62 |
| Third Embodiment | −5.92/2.24 | −2.64 |
| Fourth Embodiment | −5.63/2.22 | −2.54 |
| Fifth Embodiment | −5.92/2.29 | −2.59 |

For the above relation −6.0<R12/R13<−2.5, the values of R12 and R13 in the first embodiment to the fifth embodiment are shown in Table 17 below.

TABLE 17

| — | R12/R13 | value of R12/R13 |
|---|---|---|
| First Embodiment | 5.022/−1.378 | −3.64 |
| Second Embodiment | 6.253/−1.274 | −4.91 |
| Third Embodiment | 4.352/−1.365 | −3.19 |
| Fourth Embodiment | 5.583/−1.431 | −3.9 |
| Fifth Embodiment | 8.532/−1.532 | −5.57 |

For the above relation 0<(R8+R9)/(R8−R9)<2.0, the values of R8 and R9 in the first embodiment to the fifth embodiment are shown in Table 18 below.

TABLE 18

| — | (R8 + R9)/(R8 − R9) | value of (R8 + R9)/(R8 − R9) |
|---|---|---|
| First Embodiment | (−24.436 + 3.567)/(−24.436 − 3.567) | 0.75 |
| Second Embodiment | (−12.492 + 3.3768)/(−12.492 − 3.3768) | 0.57 |
| Third Embodiment | (160.979 + 3.382)/(160.979 − 3.382) | 1.04 |
| Fourth Embodiment | (34.555 + 3.287)/((34.555 − 3.287)) | 1.21 |
| Fifth Embodiment | (−10.493 + 3.723)/(−10.493 − 3.723) | 0.48 |

Figure 11:
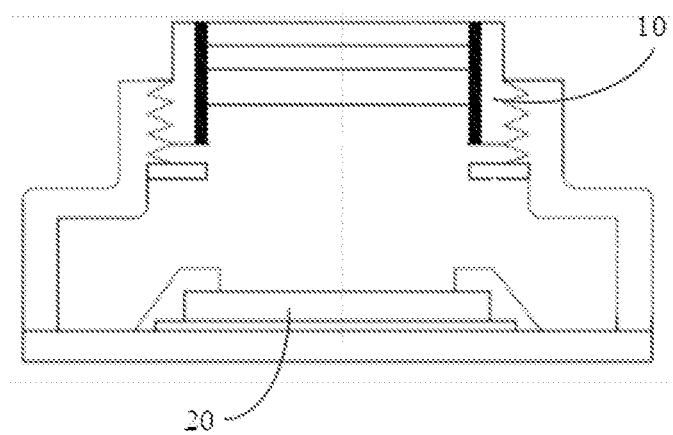
FIG. 11 is a schematic view of a camera module according to an embodiment of the present disclosure.

Referring to FIG. 11, a camera module 100 according to an embodiment of the present disclosure includes the optical lens 10 and the photosensitive element 20. The photosensitive element 20 is disposed on the image side of the optical lens 10.

The photosensitive element 20 may be a complementary metal oxide semiconductor (CMOS) photosensitive element 20 or a charge-coupled device (CCD) photosensitive element 20.

A ratio of the focal length of the second lens L2 to the focal length of the first lens L1 of the camera module 100 according to the embodiment of the present disclosure is between −5 and 15, so that the focal power of the lenses can be reasonably arranged and the shapes of the lenses can be configured reasonably, which is beneficial to enlarge the field of view of the system, improve the imaging quality, and reduce the occurrence of distortion, which is beneficial to the usage of the user.

Figure 12:
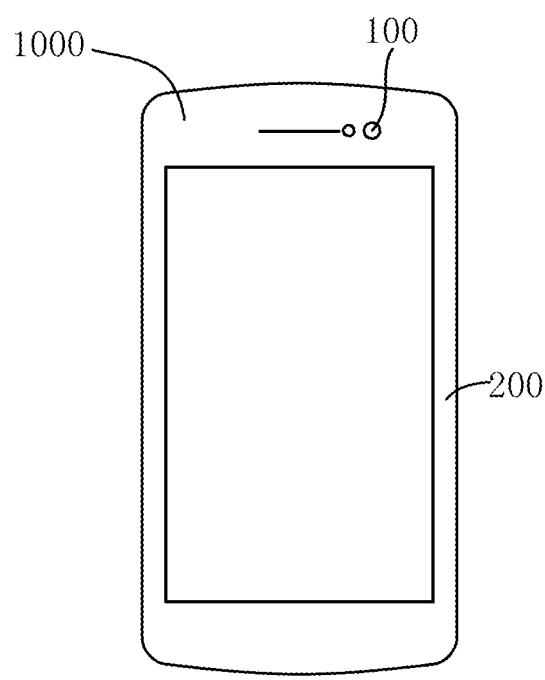
FIG. 12 is a schematic view of an electronic device according to an embodiment of the present disclosure.

Referring to FIG. 12, an electronic device 1000 according to an embodiment of the present disclosure includes a housing 200 and the camera module 100. The camera module 100 is mounted in the housing 200.

A ratio of the focal length of the second lens L2 to the focal length of the first lens L1 of the electronic device 1000 according to an embodiment of the present disclosure is between −5 and 15, so that the focal power of the lenses can be reasonably arranged and the shapes of the lenses can be configured reasonably, which is beneficial to enlarge the field of view of the system, improve the imaging quality, and reduce the occurrence of distortion, which is beneficial to the usage of the user.

The electronic device 1000 according to the embodiment of the present disclosure includes, but is not limited to, an information terminal device such as a smart phone (as shown in FIG. 12), a mobile phone, a personal digital assistant (PDA), a game console, a personal computer (PC), a camera, a smart watch, a tablet computer, or home appliances with camera functions, etc.

In the description of this specification, descriptions referring to terms "one embodiment", "some embodiments", "examples", "specific examples", or "some examples" and the like mean that specific features, structures, materials, or characteristics described in conjunction with the embodiment or example are included in at least one embodiment or example of the present disclosure. In this specification, schematic representations of the above terms do not necessarily refer to the same embodiment or example. Moreover, the described specific features, structures, materials, or characteristics can be combined in any one or more embodiments or examples in a suitable manner.

In addition, terms "first" and "second" are only used for descriptive purposes, and cannot be understood as indicating or implying relative importance or implicitly indicating the number of indicated technical features. Therefore, features defined with "first" and "second" may explicitly or implicitly include at least one of the features. In the description of the present disclosure, "plurality" means at least two, such as two, three, unless expressly defined otherwise.

While the embodiments of the present disclosure have been shown and described above, it can be understood that the above embodiments are exemplary and should not be construed as limiting the present disclosure. Changes, modifications, replacements, and variations can be made to the above embodiments by those of ordinary skill in the art within the scope of the present disclosure. The scope of the present disclosure shall be subject to the claims and their equivalents.

What is claimed is:

1. An optical lens, sequentially from an object side to an image side, comprising:
   a first lens having a negative focal power;
   a second lens having a negative focal power, an object side surface of the second lens being convex in the vicinity of an optical axis, and an image side surface of the second lens being concave in the vicinity of the optical axis;
   a third lens having a positive focal power, an object side surface of the third lens being convex in the vicinity of the optical axis;
   a fourth lens having a negative focal power;
   a fifth lens having a negative focal power;
   a sixth lens having a positive focal power, an image side surface of the sixth lens being convex in the vicinity of the optical axis, an object side surface of the sixth lens and the image side surface of the sixth lens being aspherical, and at least one of the object side surface of the sixth lens and the image side surface of the sixth lens having at least one inflection point; and
   a seventh lens having a negative focal power;

wherein the optical lens satisfies the following relation:
   $-5<f2/f1<15$, maximum optical distortion $\leq 10\%$;
   wherein f1 is a focal length of the first lens, and f2 is a focal length of the second lens;
   wherein the optical lens satisfies the following relation:
   $-6.0<R12/R13<-2.5$;
   wherein R12 is a radius of curvature of the object side surface of the sixth lens at the optical axis, and R13 is a radius of curvature of the image side surface of the sixth lens at the optical axis.

2. The optical lens according to claim 1, wherein the optical lens satisfies the following relation:
   $2.5<\tan(HFOV)*TTL/ImgH<3.5$;
   wherein tan (HFOV) is a tangent value of half of a maximum field of view of the optical lens, TTL is a distance from an object side surface of the first lens to an imaging surface of the optical lens on the optical axis, and ImgH is a radius of a largest imaging circle of the optical lens.

3. The optical lens according to claim 1, wherein the optical lens satisfies the following relation:
   $-15<f5/f<20$;
   wherein f is an effective focal length of the optical lens, and f5 is a focal length of the fifth lens.

4. The optical lens according to claim 1, wherein the optical lens satisfies the following relation:
   $-5<(f1+f4)/f<-3$;
   where f1 is a focal length of the first lens, f4 is a focal length of the sixth lens, and f is an effective focal length of the optical lens.

5. The optical lens according to claim 1, wherein the optical lens satisfies the following relation:
   $1.0<CT3/(T12+T23)<1.8$;
   wherein CT3 is a thickness of the third lens on the optical axis, T12 is an air gap between the first lens and the second lens on the optical axis, and T23 is an air gap between the second lens and the third lens on the optical axis.

6. The optical lens according to claim 1, wherein the optical lens satisfies the following relation:
   $-4<f12/f456<-1.5$;
   wherein f12 is a combined focal length of the first lens and the second lens, and f456 is a combined focal length of the fourth lens, the fifth lens, and the sixth lens.

7. The optical lens according to claim 1, wherein the optical lens satisfies the following relation:
   $0<(R8+R9)/(R8-R9)<2.0$;
   wherein R8 is a radius of curvature of an object side surface of the fourth lens at the optical axis, and R9 is a radius of curvature of an image side surface of the fourth lens at the optical axis.

8. A camera module, comprising:
   the optical lens according to claim 1; and
   a photosensitive element disposed on the image side of the optical lens.

9. An electronic device, comprising:
   a housing; and
   the camera module according to claim 8, the camera module being mounted in the housing.

* * * * *